(12) United States Patent
Bahari et al.

(10) Patent No.: US 6,880,195 B1
(45) Date of Patent: Apr. 19, 2005

(54) PIPE CLEANING DEVICE

(75) Inventors: Bijan Bahari, Aberdeen (GB); Timothy Robert Louis Derval, Aberdeen (GB)

(73) Assignee: P.A.C.T. Engineering (Scotland) Limited, Aberdeen (GB)

( * ) Notice: Subject to any disclaimer, the term of this patent is extended or adjusted under 35 U.S.C. 154(b) by 0 days.

(21) Appl. No.: 09/959,003

(22) PCT Filed: Apr. 17, 2000

(86) PCT No.: PCT/GB00/01360

§ 371 (c)(1), (2), (4) Date: Oct. 15, 2001

(87) PCT Pub. No.: WO00/63606

PCT Pub. Date: Oct. 26, 2000

(30) Foreign Application Priority Data

Apr. 17, 1999 (GB) .............................................. 9908727
May 13, 1999 (GB) .............................................. 9911016

(51) Int. Cl.$^7$ ................................................. G08B 9/04
(52) U.S. Cl. ..................................... 15/104.061; 15/3.5
(58) Field of Search ....................... 15/104.04, 104.061, 15/104.062, 104.063, 3.5, 3.51, 3.52

(56) References Cited

U.S. PATENT DOCUMENTS

| | | | | |
|---|---|---|---|---|
| 332,910 A | * | 12/1885 | Klein ..................... | 15/104.061 |
| 1,662,429 A | * | 3/1928 | Lowy .......................... | 250/303 |
| 2,248,742 A | * | 7/1941 | Burnham ............... | 15/104.061 |
| 3,056,155 A | | 10/1962 | Harmes ..................... | 15/104.6 |
| 3,525,111 A | * | 8/1970 | Von ........................ | 15/104.061 |
| 4,536,908 A | * | 8/1985 | Raubenheimer .............. | 15/1.7 |
| 5,146,644 A | * | 9/1992 | Crocco .................... | 15/104.12 |
| 5,588,171 A | | 12/1996 | Hamann .................. | 15/104.12 |
| 6,553,602 B1 | * | 4/2003 | Skarupa et al. ........ | 15/104.061 |

FOREIGN PATENT DOCUMENTS

| | | | |
|---|---|---|---|
| CH | 574771 | 4/1976 | |
| CH | 677807 | 6/1991 | |
| DE | 225176 | 8/1910 | |
| EP | 0713048 | 5/1996 | .......... F16L/55/162 |
| WO | WO 86/01751 | 3/1986 | ............ B08B/9/04 |

* cited by examiner

Primary Examiner—Robert J. Warden, Sr.
Assistant Examiner—S Balsis
(74) Attorney, Agent, or Firm—Drinker Biddle & Reath LLP

(57) ABSTRACT

A vehicle (210) for travel though a fluid-filled pipe (12) is disclosed, capable of using power derived from the fluid flow to drive the vehicle (210). Certain embodiments have drive means capable of variable pitch in order to adjust the speed and direction of the vehicle in the pipe. Certain embodiments have drive means comprising a helical arm that can vary in pitch and diameter to accommodate different sizes of pipe and/or different rates of travel along the pipe.

25 Claims, 28 Drawing Sheets

PIPE CLEANING DEVICE

The present invention relates to a vehicle, and more particularly, but not exclusively, to a vehicle for travelling in pipelines, tubing strings and other conduits.

Conventionally, non-destructive inspection, intervention and cleaning apparatus is transported through a pipeline or other conduit using a pipeline device generally referred to as a pipeline pig or crawler.

Pipeline pigs typically consist of a series of deformable disks, typically of polyurethane, which are securely mounted on a body or moulded as a one-piece unit from polyurethane or polystyrene foam. These disks or moulded forms typically form a seal with the internal surfaces of the conduit, the pig being typically driven in the direction of flow of fluids within the pipeline due to differential pressure created across the pig. Pigs move with the fluid flow in the conduit.

Conventional pigs have the disadvantage in that the velocity and direction of movement of the pig is controlled by the differential pressure across the device (i.e. the direction and rate of flow of fluids within the pipeline). Thus, to control the velocity and direction of movement of the pig requires control over the flow of fluids within the pipeline. In particular, fluid flowing through the conduit typically have excursions of velocity and acceleration as the fluid flow within the pipeline is often not a constant due to various factors.

Many solutions have been attempted to overcome these problems, for example by passive control of the pig wherein a fixed bypass of drive fluids is used to control the velocity and direction of the pig. Other embodiments of conventional pigs incorporate a degree of controllability by using flow-controlled or pressure-controlled bypass devices. In an attempt to overcome the reliance of pigs on the internal fluid flow within the conduit for motive powers, external power and control of these devices is used via, for example, umbilical power cables or wire line power cables attached from a surface vessel, or the like, to the device itself.

However, these devices rely on an external power source outwith the pipeline conduit and also on a power transfer cable or hose, which typically limits the range of travel of such devices.

According to the present invention there is provided a vehicle for a pipe, having a power generator driven by fluid flowing past the generator, wherein the power from the generator is used to power movement of the vehicle.

A magneto-hydro-dynamic generator can be used as the generator, but it is preferred that a simple turbine, vane or paddle is employed. The turbine can be mounted to rotate axially in the pipe or across the axis, and its rotation driven by the fluid flow is used to power movement of the vehicle.

The vehicle can have drive means such as wheels disposed against the inner surface of the pipe and coupled to the turbine vane via a gearbox and shaft so that rotation of the turbine shaft drives the drive wheels along the inside surface of the pipe.

The drive wheels can be arranged to grip or cut into the inner surface of the pipe. This enhances the grip that the vehicle exerts on the pipe and also allows the vehicle to clean wax and scale etc from the inner surface while it is travelling. In certain embodiments that travel against the flow in the pipe, this is a great advantage, because the scale, wax or other debris dislodged from the inner surface of the pipe simply flows downstream with the flow of fluid, and does not travel ahead of the vehicle and obstruct its progress through the pipe. Even in embodiments that travel with the flow, the debris will be swept before the vehicle.

Wheels are preferred, but could be substituted by tracks or jets etc. The blades can optionally be circular wheels with sharp edges mounted on an axis to rotate and cut or grip the surface of the pipe.

The vehicle may have a scoop for dislodging debris on the pipe wall that is separate from the wheels.

The power transmission from the turbine to the drive means is normally by way of direct coupling via a drive shaft to a gearbox, but other embodiments can indirectly use the power of the rotation of the turbine vane to charge a battery which can be used to power the drive means. A combination of direct transmission and battery storage is also feasible, and is especially useful should flow through the pipe stop while the vehicle needs to move. The power coupling can be electrical and can drive an electric motor that drives the wheels. Hydraulic motors and power couplings can also be used.

Any suitable gearbox can be used, but in some embodiments shown herein an epicyclic M007 Ingersol Rand air motor gearbox was used.

The drive wheels are preferably disposed in a row of 4 or more on heads carried on arms on the vehicle. The attitude of the heads can optionally be adjustable so as to change the direction of force applied by the wheels. This is especially useful to control the speed and direction of movement of the vehicle as follows.

The heads can be set at 90° attitude with respect to the axis of the pipe. In that attitude, with the wheels all rotating in the same direction, the arms rotate around the axis of the vehicle inside the pipe without axial translocation. On the other hand, the heads can be set at 0°, in which case the vehicle will be propelled axially through the pipe at high speed with no rotational movement. The heads can be set at an intermediate attitude between 0° and 90° whereby they will follow a helical path through the pipe. The axial speed will increase as the attitude approaches 0° and will decrease as the attitude approaches 90°. Conversely the pitch and extent of rotation of the arms will increase as the attitude approaches 90° and decrease as it approaches 0°. Thus the pitch of the helical path (and therefore the ease with which the vehicle moves against a fluid flow), and the axial speed of movement can be controlled by altering the attitude of the heads.

The pitch of the helical path through the pipe is a useful parameter to control, since variation in this allows a gearing for movement of the vehicle through vehicle will move slowly but will be able to overcome high forces retarding it. With a low pitch helix the vehicle will have a relatively lower power, but will move with greater speed.

Furthermore, the attitude of the heads also controls the direction of axial movement in the pipe, as the heads can be turned through 90° (parallel to the pipe axis) and can drive the vehicle in the opposite direction. Thus certain embodiments of the vehicle of the invention can move against the flow of fluid in the pipe, can stop or slow down or can proceed axially at high speed by altering the attitude of the heads. Such alteration can be set before use or can be effected during use.

The vehicle can be controlled by remote wire if desired but onboard control by PC or other electronic circuits is one preferred option.

Simpler embodiments of the invention can simply be set to travel at a given speed or pitch of helix through a pipe without any other control features.

Telemetry gathered by the vehicle can be transmitted along the pipe by wire, ultrasonics or other conventional methods, or through the pipe wall to ROVs etc by ultrasonic means etc.

An optional controller can comprise an on-board or remote electronic device or can alternatively (or additionally) comprise a mechanical governor or electromechanical control system.

In certain embodiments the whole vehicle can rotate in a spiral path as described later, but the body of the vehicle preferably remains static relative to the rotational movement of the turbine and drive arms. This gives better purchase by the arms and can be achieved by means of stabilisers which bear against the inside surface of the pipe and resist rotation of the body. Alternatively, two sets of drive arms can be provided which are capable of contra-rotation. Two or more turbine vanes can also be provided, also capable of contra-rotation if desired.

The turbine vane can typically be attached to a conventional turbine having a hub and driving a shaft, but certain embodiments can comprise an annular ring turbine having vanes extending inwardly from an outer annular ring and no hub, with annular arrangements of gears and motors coupled to the ring to drive the drive means. The turbine vane can be featherable. Typical turbine vanes can comprise ROV propellers (we used a Curvetech HT series ROV thruster for some embodiments).

A cowling can be provided to guide fluid flowing past the vehicle onto the turbine vanes and to guide it out of the vehicle in an efficient manner.

The or each drive arm may be in the form of a radially extending arm coupled to a gearbox and having a telescoped and/or spring section to force the wheel at the radially outward end against a wide variety of pipe diameters.

Alternatively, the drive arm can be in the form of a helix with a pitch variable from the controller and having drive wheels spaced therealong. The helical arm can be varied in pitch so as to vary the axial velocity of the vehicle's path along the pipe, and also can be compressed radially to fit different diameters of pipe.

Spring means or compressibility of the drive arms (by hydraulic, pneumatic or spring means) is beneficial since it allows the vehicle to negotiate bends in the pipe or irregularities in the surface (e.g. flange connections). The vehicle may have an articulated joint to facilitate turning of the vehicle around bends. Steering control may be incorporated in the articulation or in the shock absorber units. In certain embodiments the air cylinders/rams of the shock absorbers were arranged to guide the vehicle around corners in the pipe.

Embodiments of the present invention shall now be described, by way of example only, with reference to the accompanying drawings in which.

Figure 1:
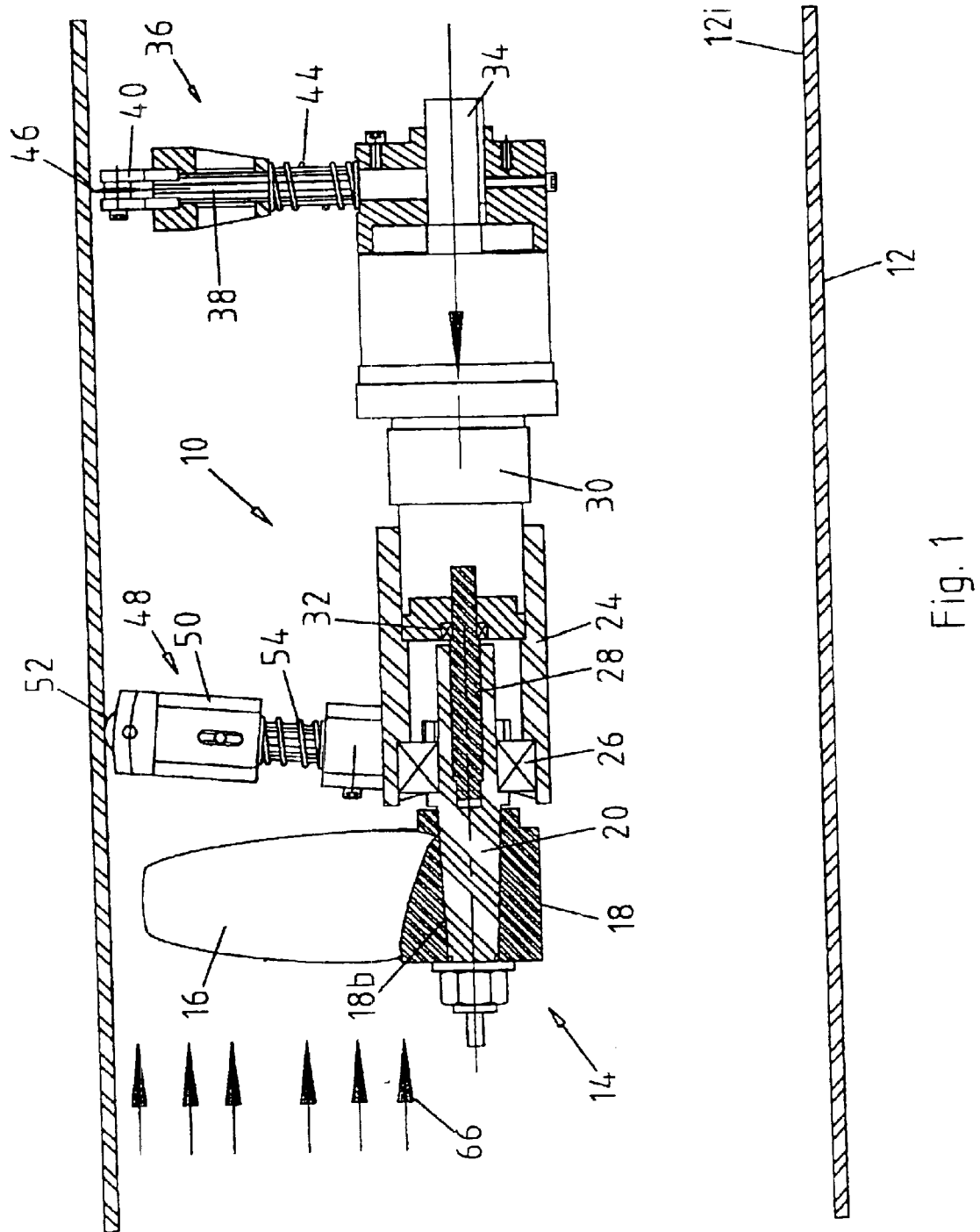
FIG. 1 is a part cross-sectional side elevation of a vehicle according to the present invention installed in a pipeline.
Figure 2:
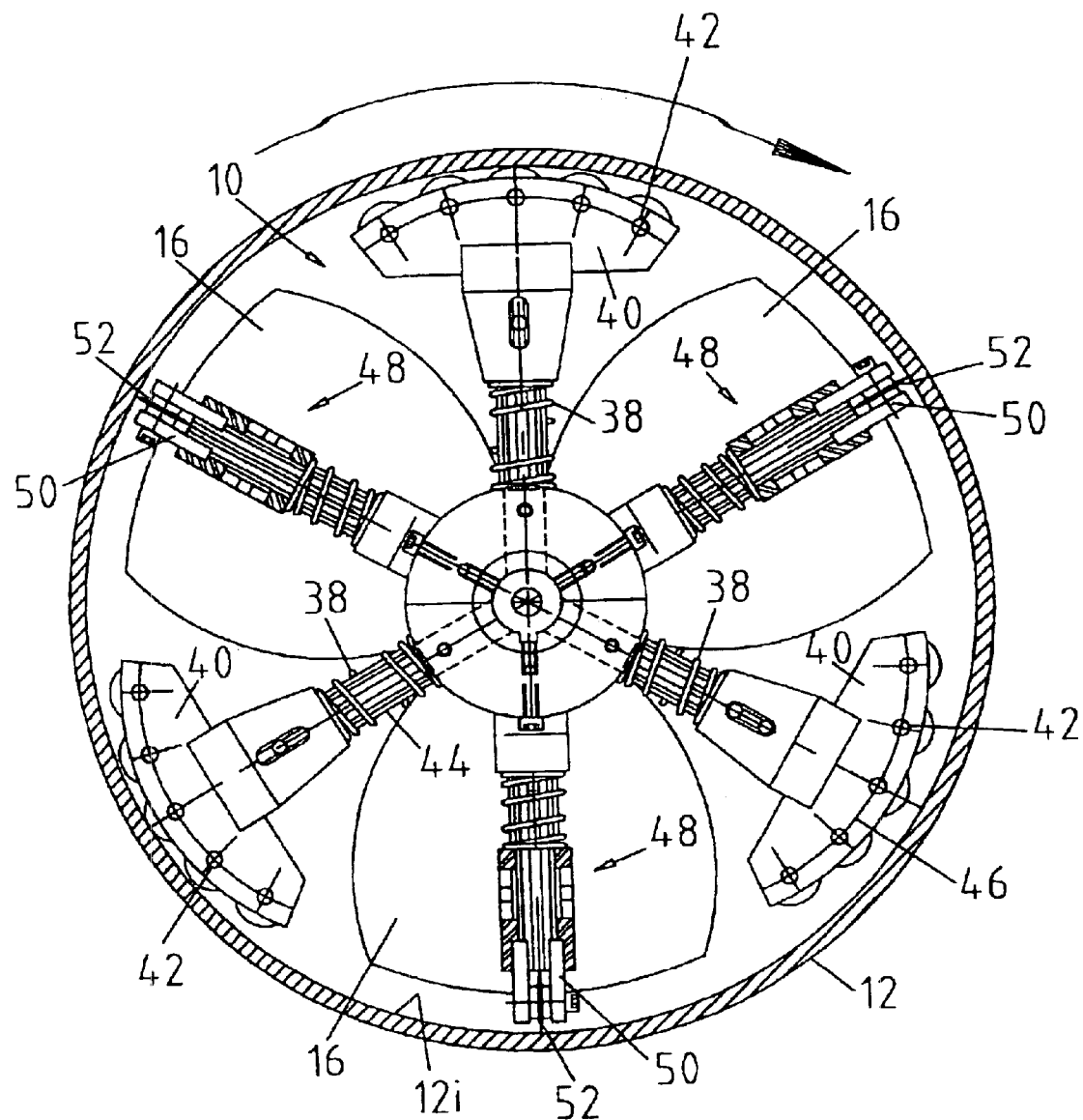
FIG. 2 is a part cross-sectional end elevation showing the vehicle of FIG. 1 installed in a pipeline.
Figure 3:
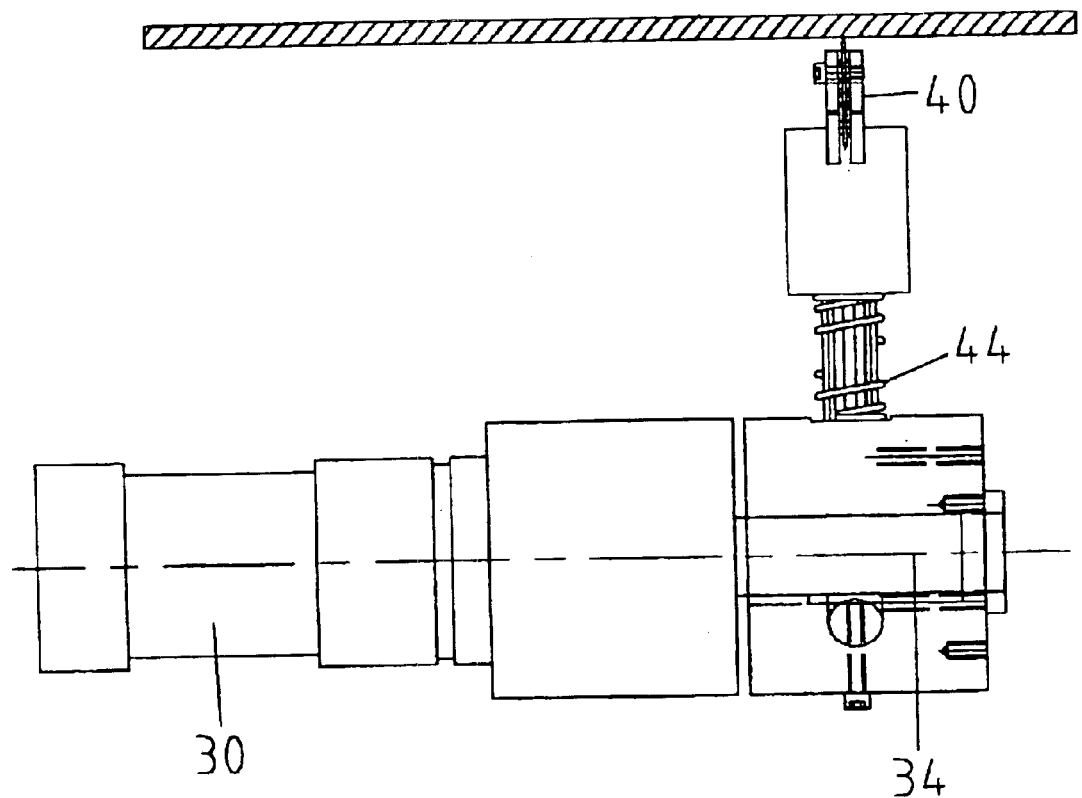
FIG. 3 is a side elevation of a drive mechanism for use with the vehicle of FIGS. 1 and 2.

Referring to the drawings, FIGS. 1 and 2 show a first embodiment of a vehicle, generally designated 10, installed in a pipeline or conduit 12. Vehicle 10 includes a power generator, generally designated 14, which typically comprises a propeller or turbine, which has a plurality of turbine blades 16. As shown in FIG. 2, vehicle 10 is provided with three radially displaced turbine blades 16, although it will be appreciated that any number of turbine blades may be used. Blades 16 are attached to a central hub 18 which has an extension shaft 20 located in an axial bore 18b of the hub 18, and may be retained in position using any conventional means. The shaft 20 is rotatably mounted in a stator 24 using an annular thrust bearing 26 to allow for rotational movement of the shaft 20 within the stator 24. Shaft 20 is coupled by any conventional means to an input shaft 28 of a gearbox 30, the input shaft 28 rotating on a second annular thrust bearing 32. An output shaft 34 of the gearbox 30 is coupled by any conventional means (e.g. via a screw) to a drive mechanism, generally designated 36.

As shown more clearly in FIG. 2, drive mechanism 36 includes three radially displaced drive arms 38. Drive arms 38 each have a wheel housing 40 at a distal end, the wheel housings 40 having at least one wheel 42 rotatably mounted therein. Wheel housing 40 may be attached to drive arm 38 by any conventional means, but is advantageously telescopic and spring loaded using spring 44 which biases wheel housing 40 radially outwards, thus forcing wheels 42 into contact with an inner surface 12i of the pipeline 12.

Spring 44 facilitates biasing of wheels 42 into engagement with inner surface 12i of pipeline 12, and advantageously provides two further functions. Firstly, spring 44 allows for adjustment of the radial displacement of the wheel housing 40, wherein the vehicle 10 may be centred and used within different pipelines of varying inside diameter. Secondly, springs 44 also function as shock absorbers to absorb any radial inward force which may be applied to the drive arm by any inwardly projecting object, such as a welds or flange joints on the pipeline 12, which protrude inwardly from the inner surface 12i. Thus, vehicle 12 may be used with various pipelines having different inner diameters, and vehicle 10 may also negotiate with minimal reduction in speed any inwardly protruding objects within the pipeline 12.

Each drive arm on the embodiment shown in FIG. 2 has five wheels 42 disposed on a semicircular axis 46. This arrangement ensures that at least one wheel 42 contacts the inner surface 12i of the pipeline 12 during use, and also facilitates use of the vehicle 10 with pipelines having inner surfaces which are not precisely circular in cross-section.

Vehicle 10 is also provided with at least one stabiliser, generally designated 48. As shown more clearly in FIG. 2, vehicle 10 has three radially displaced stabilisers 48 although it will be appreciated that any number of stabilisers 48 may be used. Stabiliser 48 typically includes a wheel housing 50 which has a wheel 52 biased by a spring 54 into engagement with the inner surface 12i of the pipeline 12. It will be appreciated that spring 54 provides the same functions as spring 44 in the drive mechanism 36. Stabiliser 48 may be attached to vehicle 10 using any conventional means.

Figure 4:
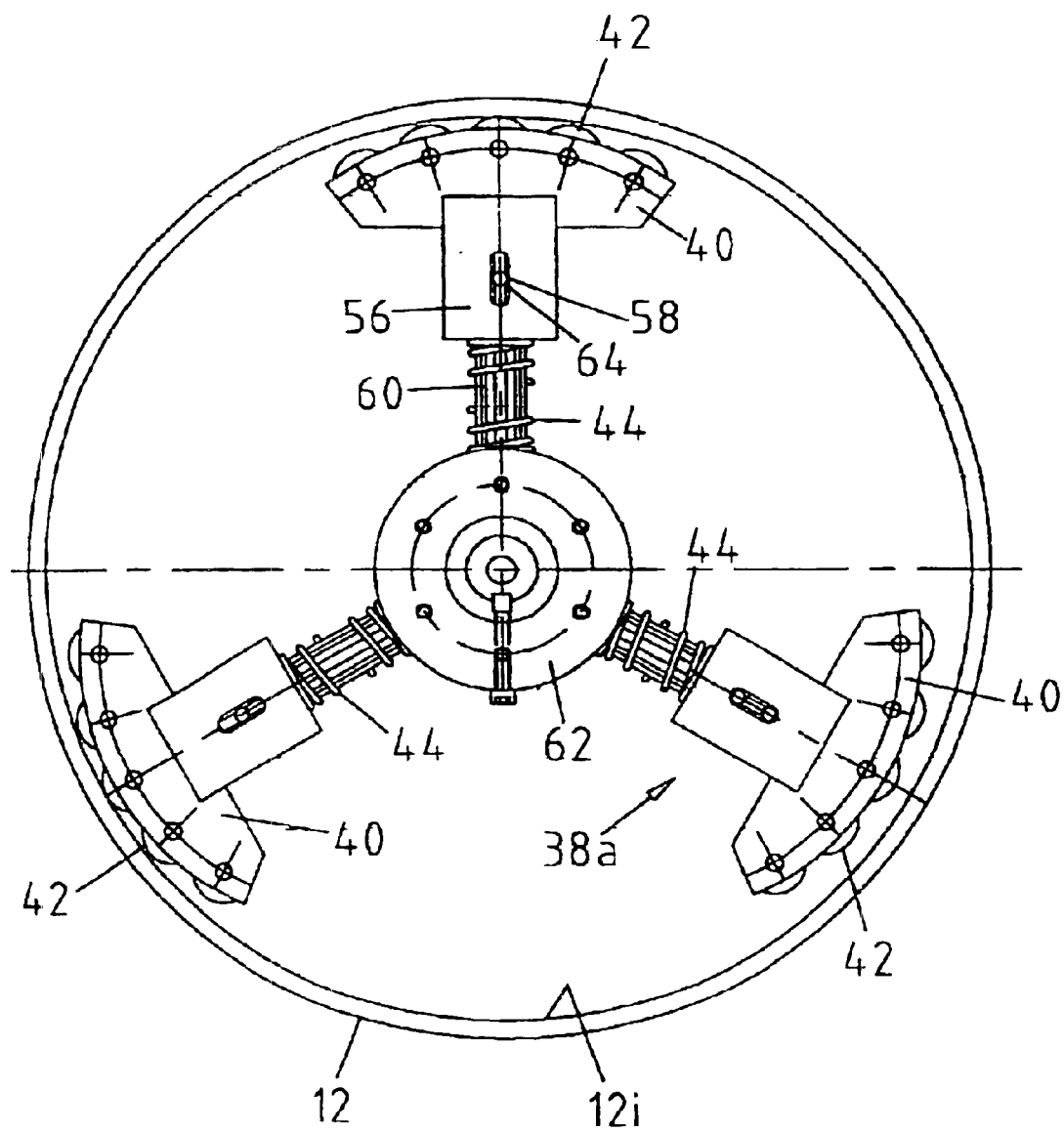
FIG. 4 is a end elevation of the drive mechanism of FIG. 3.

Referring to FIG. 4, the drive arm 38 includes a spline bush 56 which is provided with a longitudinal slot 58, a spline 60 which is attached to a central hub 62 and project outwardly. Spline 60 is provided with a pin 64 which is retained within the slot 58 of the spline bush 56. When the vehicle 10 is being inserted into a pipe 12, the radial displacement of the wheels 42 is reduced by moving the wheel housing 40 radially inward and locking in place using the pin 64, as shown by arm 38a in FIG. 4. Once the vehicle 10 is within the pipeline 12, the pin 64 is released by any conventional means so that the drive arm 38 extends radially outward whereby wheels 42 contact the inner surface 12i of the pipeline 12.

The wheels of the drive mechanism 36 shown in FIGS. 1 to 4 are illustrated as being angled perpendicular to the longitudinal axis of the pipeline 12. However, the angular displacement or attitude of the wheel housings 40 can be optionally adjusted using an adjustment mechanism (not shown) which allows the angular displacement of the wheel housings 40 to be rotated relative to the longitudinal axis of the pipeline 12. This rotation of the wheel housing 40 allows the direction of travel and/or the velocity of the vehicle 10 within the pipeline 12 to be adjusted.

The wheel housing 40 can be rotated relative to the longitudinal axis of the pipeline 12 so that it is in a plane which is between 90° (i.e. perpendicular to) and 0° (i.e. parallel with) the longitudinal axis of the pipeline 12. Thus, as the wheels move between the 90° position towards the 0° position, the velocity and the helical pitch of the path travelled by the vehicle 10 can be controlled. The closer the plane of the wheels is to the 0° position parallel with the longitudinal axis of the pipeline 12, the faster the velocity of the vehicle 10 in the direction of travel will be and the path of the drive arms will follow a more relaxed pitch of helix.

By changing the angular displacement of the wheel housing 40, the direction of travel of the vehicle 10 can also be controlled. When the plane is perpendicular to the longitudinal axis, the drive mechanism will not exert any axial force on the vehicle. With the drive heads set at 90°, the vehicle will travel with the flow in the pipeline. This can be a useful feature in retrieving the vehicle, since a signal can be given to the drive heads to adopt the 90° position (or that can be their default position in the event of failure) and the vehicle can then be recovered at the end of the pipeline after moving with the flow.

Referring to FIG. 1, if the front of the wheel housing 40 (defined by the direction of rotation of the wheels) is rotated towards the left as shown in FIG. 1, the vehicle will move towards the left; conversely, if the drive arm 38 is rotated so that the front of the wheel housing 40 moves towards the right as shown in FIG. 1 the vehicle will move in the reverse direction (that is towards the right of FIG. 1). Thus, vehicle 10 is bi-directional, the direction of travel being set by the angular displacement of the wheels 42. In this way, the velocity and the direction of travel of the vehicle 10 is independent of the rate and direction of fluid flow within the pipeline 12, and independent of the direction and speed of travel of the wheels. Thus, the vehicle 10 can either go against or with the flow of fluid in the pipeline 12.

It will be appreciated that with the heads set in an intermediate position the arms move in a spiral or helical path (at a pitch dependent on the attitude of the heads) thereby moving the vehicle in either a forward or a reverse direction through the pipeline 12. This is advantageous as it reduces the power and torque required to overcome forces retarding the vehicle 10, such as fluid flow.

It should be noted that the velocity and direction of the vehicle 10 may also be changed by adjusting the gearbox ratios and/or by providing a reverse gear within the gearbox 30.

In use, the vehicle 10 is inserted into the pipeline 12 by radially displacing the wheel housings 40 inward as described above (i.e. to the position of arm 38a in FIG. 4), and then releasing the wheel housings 40 once the vehicle 10 is in the pipeline 12 so that the wheels 42 contact the inner surface 12i of the pipeline 12. The attitude of the wheel housings 40 is then adjusted to give the required direction of travel of the vehicle 10 and also to set the pitch of helix (and therefore the axial velocity) in the direction of travel.

The pipeline 12 typically contains a fluid, such as gas or other hydrocarbon or water etc, which is travelling in the direction shown by arrows 66 in FIG. 1. The fluid impacts on the blades 16 of the power generator 14 and causes their rotation. Rotation of the blades 16 causes the shaft 20 to rotate on thrust bearing 26 and thus the gearbox input shaft 28 to rotate on bearing 32. The rotational movement of the propeller blade 16 is thus transmitted via the gearbox 30 (with a specific gearing ratio if required) to the gearbox output shaft 34. The rotational drive of the gearbox output shaft 34 powers rotation of the wheels 42 which causes the vehicle 10 to move in the specified direction of travel at the specified velocity. In this way, the vehicle 10 is capable of generating its own power to drive the drive mechanism 36 by using the inertia of the fluid impacting on the blade 16 to cause a rotational torque which is transferred from a high revolution and low torque, to a low revolution and high torque applied to the wheels 42 via the gearbox 30.

As the vehicle 10 moves in its intended direction of travel, the drive arms spiral because of the attitude of the wheel housing 40. This gives a mechanical advantage in that the torque required to go against the flow in the pipeline is comparatively less than if the arms did not spiral. In certain embodiments, the whole vehicle can spiral.

It should be noted that the structure of the drive arms 38 and the stabilisers 48 is advantageously designed to reduce friction with the fluid flow, and may be shaped similar to the turbine blades 16.

Thus, the drive arms 38 and stabilisers 48 can also assist in propelling the vehicle 10.

The turbine can be located at one end (e.g. the back end) of the vehicle, but can function equally well in the centre of the vehicle. The vehicle can have one drive mechanism or several in series, and more than one vehicle can be used to drive a train of instruments or cleaning devices etc. An optional power supply can be provided on board or on a separate vehicle or module.

Figure 5:
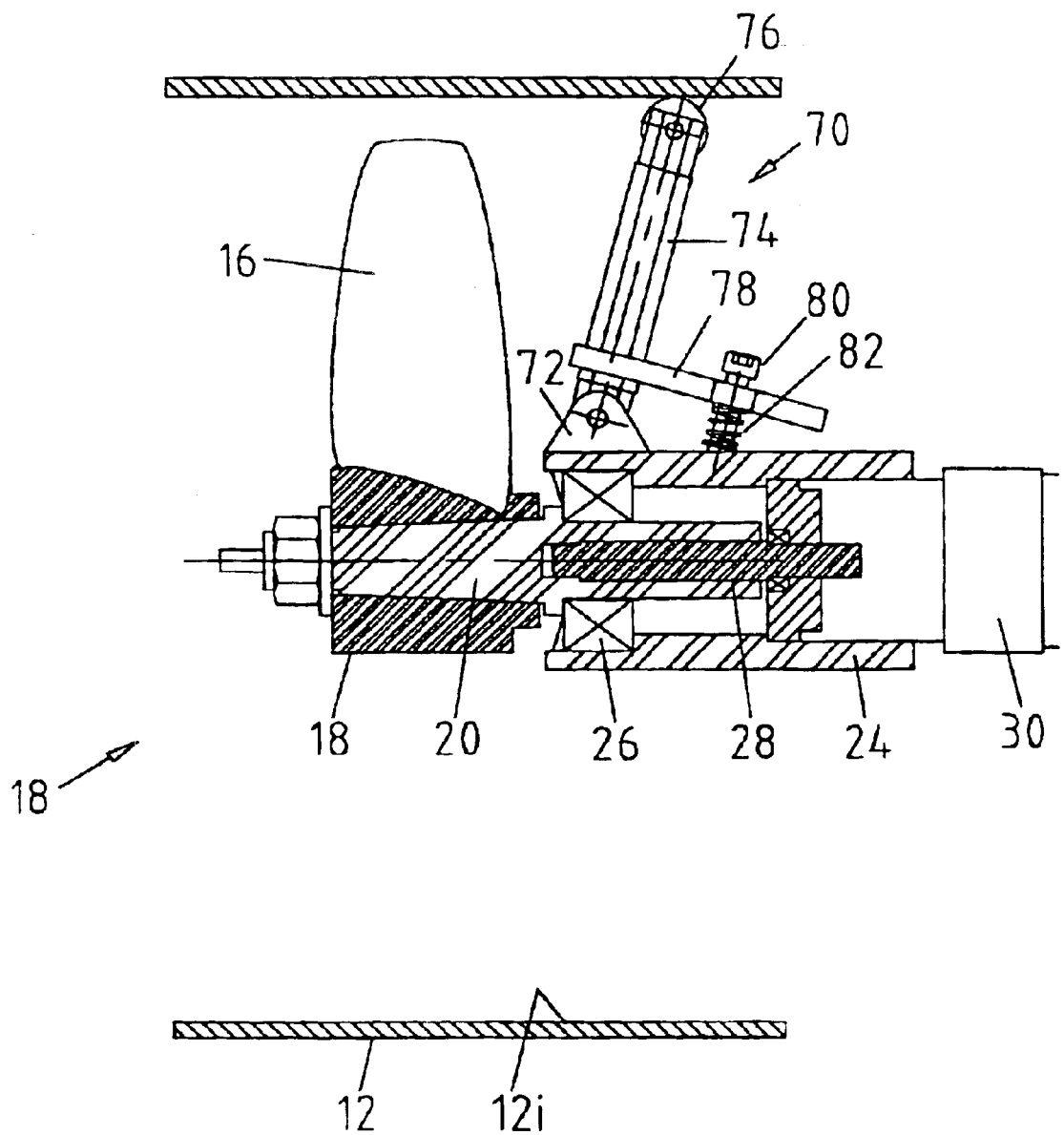
FIG. 5 is a partly cross-sectional side elevation of a power generator for use with the vehicle of the present invention.
Figure 6:
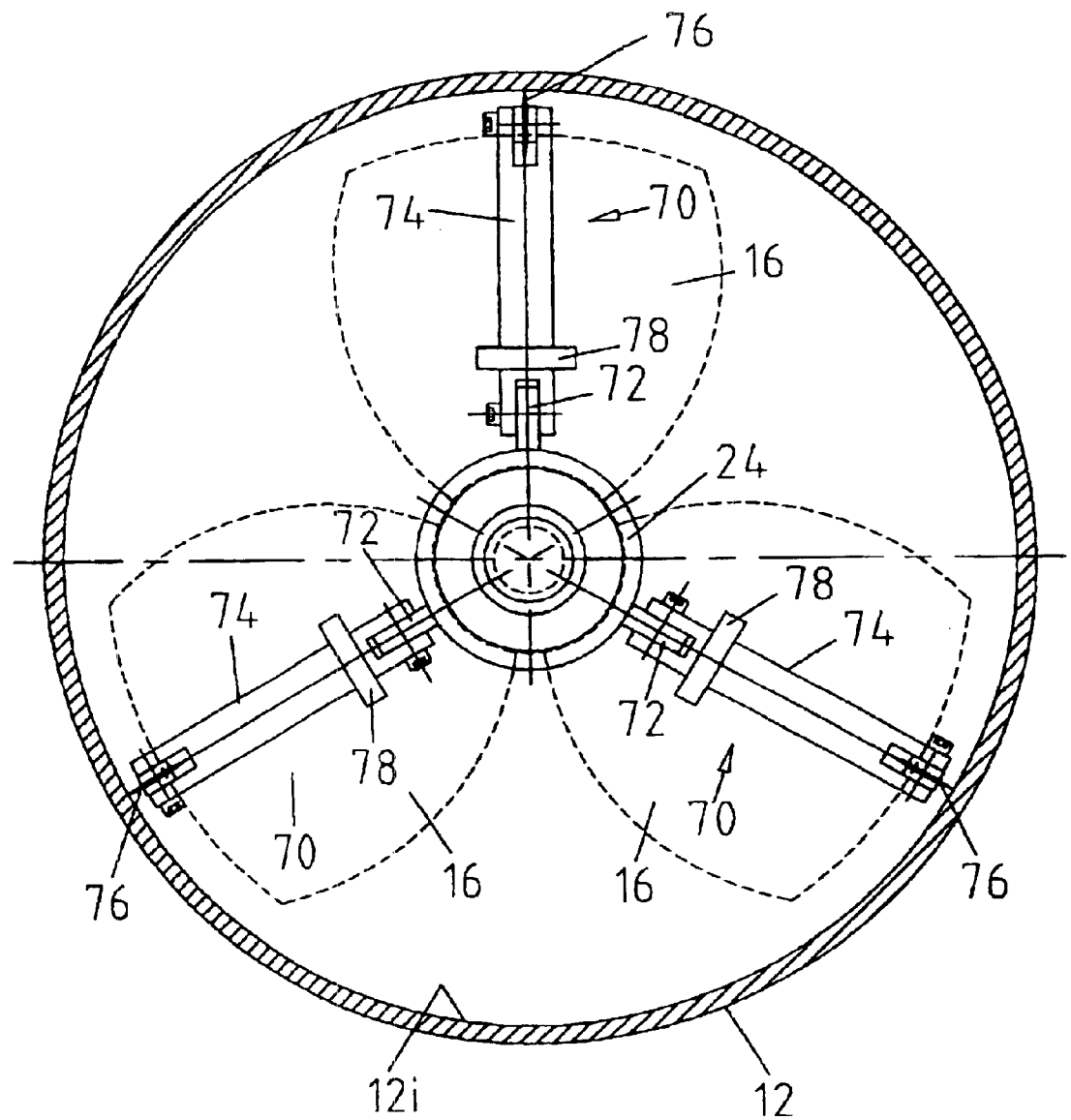
FIG. 6 is an end elevation of the power generator of FIG. 5.

Referring now to FIGS. 5 and 6, there is shown an alternative stabiliser 70. Stabiliser 70 is pivotally attached to a bracket 72 on the stator 24 using any conventional means, such as a pin. The stabiliser 70 includes a telescopic arm 74 which extends radially outwards and is provided with a wheel 76 at the distal end of it's outer cylinder which contacts the inner surface 12i of the pipeline 12. A reaction arm 78 is attached to the outer cylinder of the arm 74 of the stabiliser 70 and extends perpendicular to the longitudinal axis of the stabiliser arm 70. The reaction arm 78 is attached to the stator 24 using a pin 80 which may be attached to the stator 24 using a screw thread, for example, which retains the reaction arm captive on the stator but allows it to approach the stator body. A spring 82 is provided between the stator 24 and the underside of the reaction arm 78, spring 82 providing the same function as springs 44 and 54 described above.

Thus, the stabiliser 70 can be adjusted so that the vehicle 10 can be inserted into pipelines of varying diameter and can also absorb shocks from protrusions within the pipeline 12, absorbing the force imparted by these intrusions using spring 82.

Figure 7:
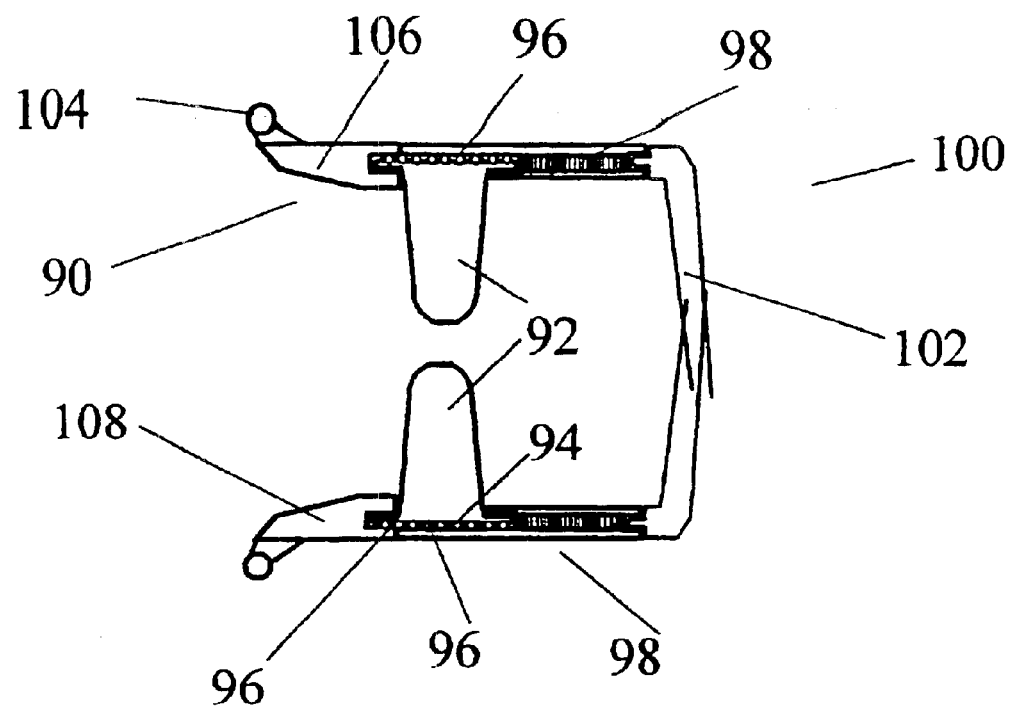
FIG. 7 is a schematic side elevation of an annularly mounted power generator.
Figure 8:
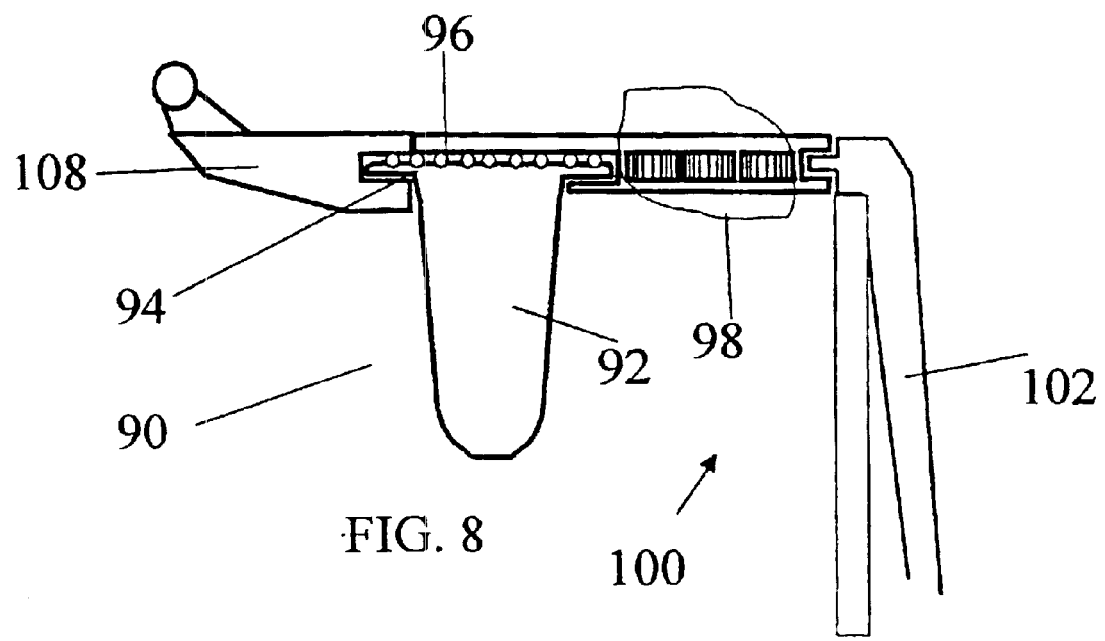
FIG. 8 is an enlarged view of the power generator of FIG. 7.
Figure 12:
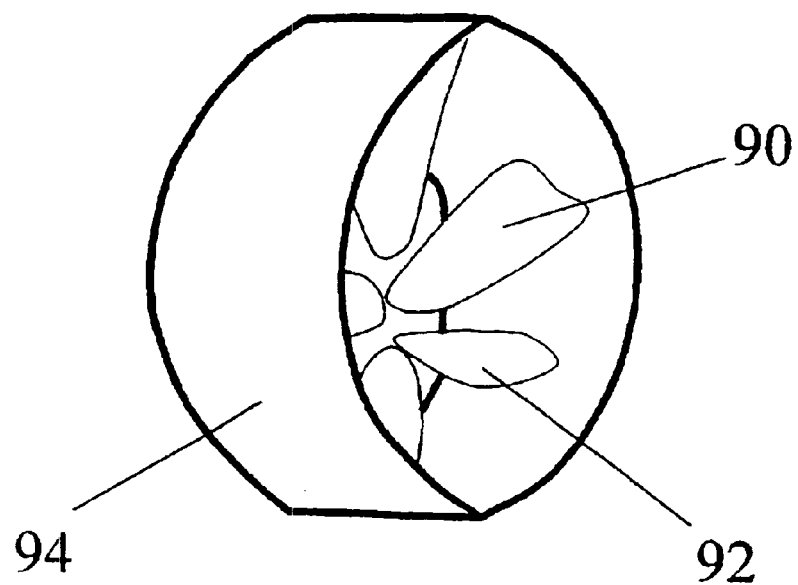
FIG. 12 is a isometric view of the power generator of FIGS. 7 to 9.

Referring now to FIG. 7, there is shown an alternative embodiment of a power generator, generally designated 90, which includes a plurality of propeller blades 92, more clearly shown in the perspective view of FIG. 12. The blades 92 are mounted on an annular ring 94 which forms the rotor of the power generator 90, and typically extend radially inward. Annular ring 94 is mounted on a plurality of bearings 96 on which the annular ring rotates when fluid acts on the blades 92. The torque generated by the blades 92 and annular ring 94 is transferred through a gearbox, schematically shown at 98, which is housed in the annular housing or stator of the vehicle 100, to a helical drive arm 102, which will be described in detail hereinafter.

The vehicle 100 is provided with a plurality of stabilising wheels 104 which are attached to frame 106 or a cowling of the vehicle 100. Frame 106 includes a flow focusing nozzle 108 which directs fluid flow within the pipeline (not shown) towards the blades 92 of the power generator 90.

The pitch of the blades 92 can be variable to effect changes in the rotational velocity, thus changing the velocity of the vehicle 100. Changing the pitch of the blades 92 can also change the direction of travel of the vehicle 100 from forward to reverse, using a similar principle to the angular adjustment of the wheel housing 40 in the vehicle 10 shown in FIGS. 1 to 4. More than one blade can be provided e.g. from 2–10 blades may be suitable.

Figure 13:
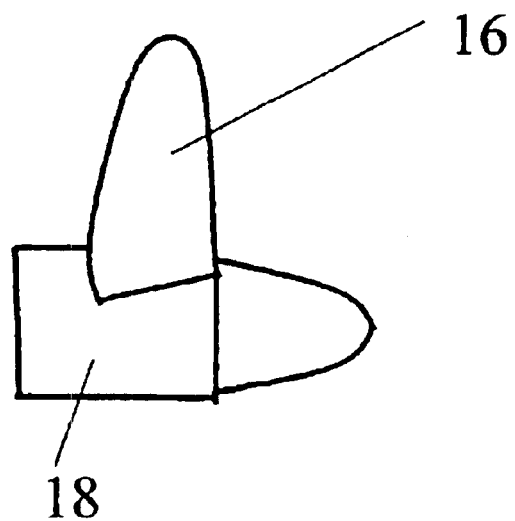
FIG. 13 is a side elevation of a power means for use with the present invention.

As illustrated in FIG. 13, the angular displacement of the blades 16 of the vehicle 10 can also be adjusted to effect changes in rotational velocity as described above. This adjustment can govern the velocity and direction of movement of the vehicle 10, and can also make the vehicle 10 more efficient. There may be more than one stage of propellers.

Figure 9:
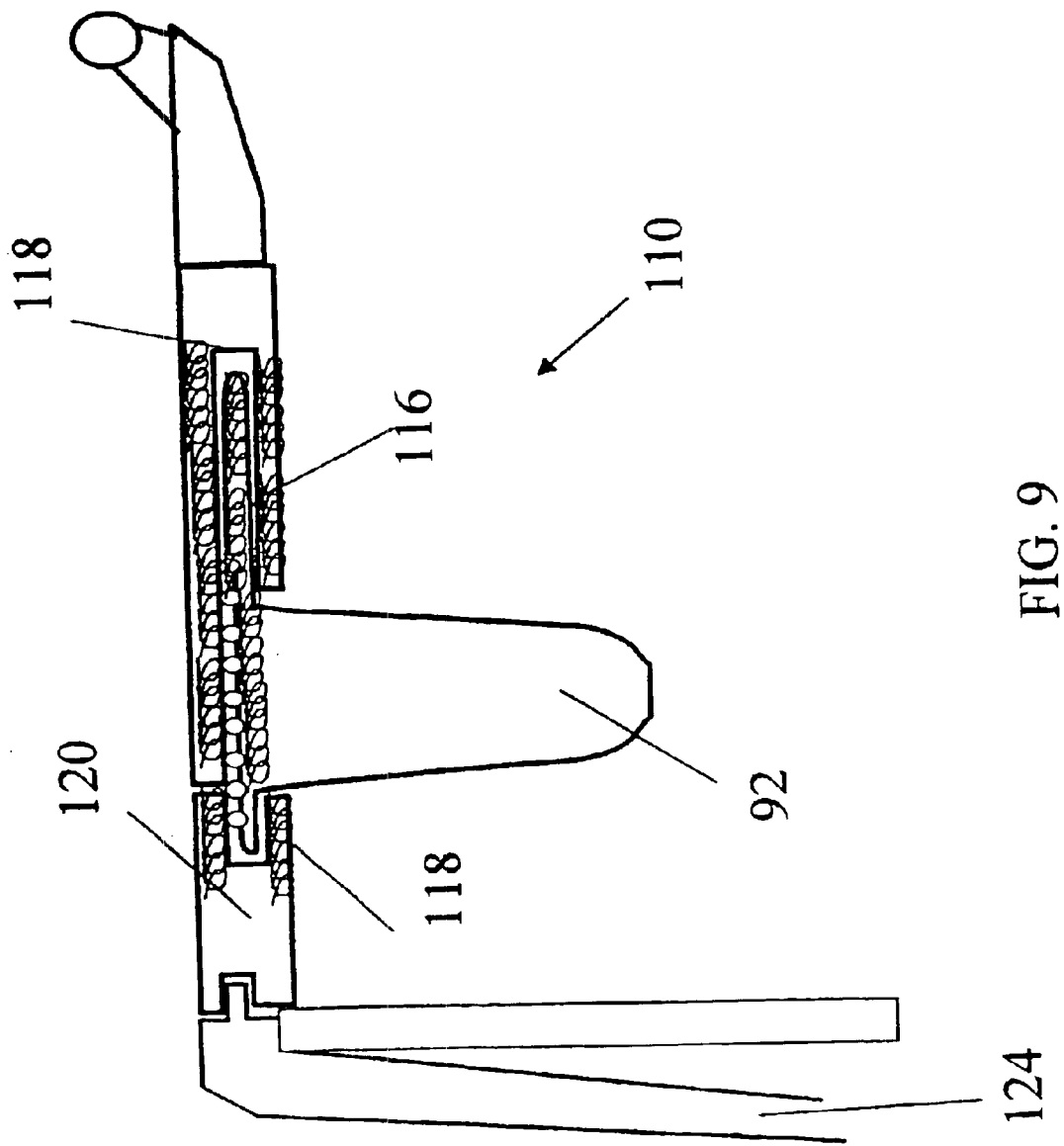
FIG. 9 is an enlarged side elevation of a electric mechanical power generator.

It should be noted that the power generator could comprise an electro-mechanical power generator, as opposed to a pure mechanical form. Referring to FIG. 9, there is shown an alternative power generator 110 which is similar to generator 90, but is of the electro-mechanical type. In the embodiment shown in FIG. 9, the power generator 110 includes blade 112 radially mounted on an annular ring 114. Annular ring 114 has a wire coiled within the ring 114 which acts as a rotor coil 116. The annular ring 114 rotates on bearings 118 provided on the stator 120, the stator 120 including a stator coil 122 which together with the rotor coil 116 comprises an electrical generator. The power generated by the electrical generator can be used to drive an electrical motor (not shown) which can be used to drive the driving mechanism which may comprise a helix 124 or the driving mechanism 36 of vehicle 10. In addition, the power from the electrical generator can be used to power other equipment, such as intervention equipment, inspection equipment, cameras, gauges or cleaning equipment as will be described hereinafter.

In addition, the electrical power generated by the generator can be stored in, for example, a plurality of batteries (not shown). This is advantageous where if the fluid flow within the pipeline stops, the power stored within the batteries may be used to drive the electrical motor of the vehicle and hence propel it along the pipeline, or any of the ancillary equipment associated with the vehicle.

The drive arms can be set at a preselected angle to govern direction (forward and reverse) and velocity (by varying the pitch). Couplings may be mechanical or viscous to allow synchronicity with multiple drive wheels.

Figure 16:
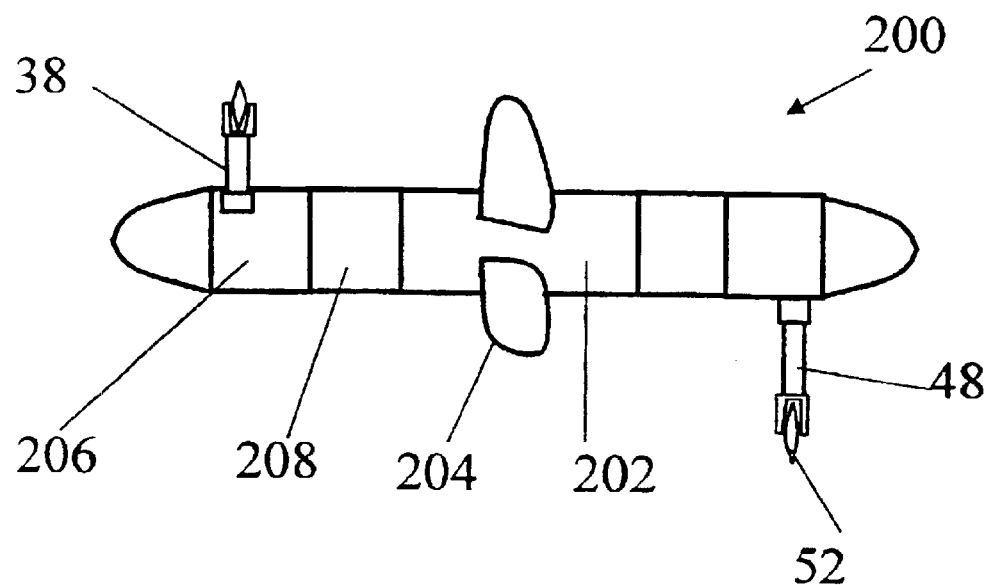
FIG. 16 is a side elevation of a fifth embodiment of a vehicle.

FIG. 16 shows an embodiment of a vehicle 200 which is an electrical equivalent of vehicle 10 shown in FIGS. 1 to 4. Vehicle 200 includes an electrical power generator 202 which includes a turbine or propeller 204. Rotation of the propeller 204 generates electricity (generally direct current (dc)) which drives an electric motor 206 through a gearbox 208. The electric motor 206 typically drives the drive arms or other drive mechanism described herein. It should be noted that vehicle 200 may require to be intrinsically safe if used in a pipeline carrying hydrocarbons to prevent accidental explosions.

Figure 10:
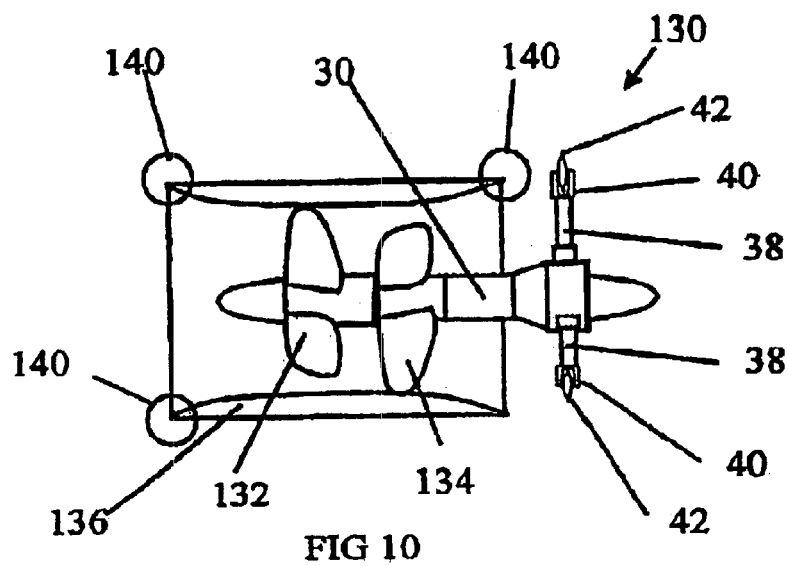
FIG. 10 is a side elevation of an alternative embodiment of a vehicle.

Referring now to FIG. 10, there is shown a third embodiment of a vehicle 130. The vehicle 130 is similar to vehicle 10, except that two power generating turbines 132, 134 are provided. This duplication of turbines provides a more efficient generation of power than a single turbine alone. It will be appreciated that any number of turbines 132, 134 may be coupled together to increase the efficiency further. The turbines 132 134 can be arranged to contra-rotate if desired in order to reduce stresses on the body of the vehicle 130, and to increase efficiency.

The coupling from the gearbox to the drive mechanism can be either a direct coupling or through a viscous coupling to allow synchronisation with the other drive wheels.

Vehicle 130 includes a convergent/divergent nozzle 136 which focuses the flow of fluid onto the turbines 132, 134 and then allows the fluid to expand thereafter. Nozzle 136 has a plurality of wheels 140 attached thereto, the wheels 140 providing a stabilising function for the vehicle 130. Nozzle 136 may be attached to the main body of the vehicle 130 by any conventional means.

Figure 11:
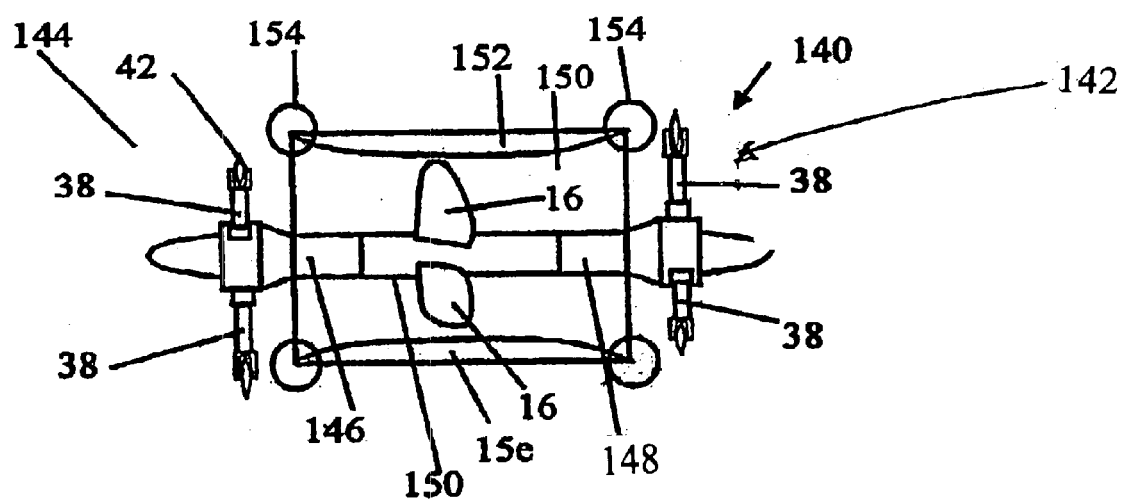
FIG. 11 is a side elevation of a third embodiment of a vehicle.

Referring to FIG. 11 there is shown a fourth embodiment of a vehicle 140 which has two contra-rotating drive mechanisms 142, 144 which are attached through respective gearboxes 146, 148 to a central power generator 150. Power generator 150 may be either a mechanical or a electro-mechanical power generator as described above. Gearboxes 146, 148 are preferably matched gearboxes which contra-rotate the drive mechanisms 142, 144. Provision of two contra-rotating drive mechanisms 142, 144 provides for balance of the vehicle 140 and also gives increased power. The tendency of the vehicle body to rotate can also be controlled by contra-rotating turbines. A convergent/divergent nozzle 152 directs the fluid flow within the pipeline towards blades 16 of the power generator 150 as before, the nozzle 152 being provided with wheels 154 to give a stabilising function. It should be noted that the power generator may comprise more than one turbine, as shown in FIG. 10. The contra-rotating drives can be helical as described in the previous embodiment.

Figure 14:
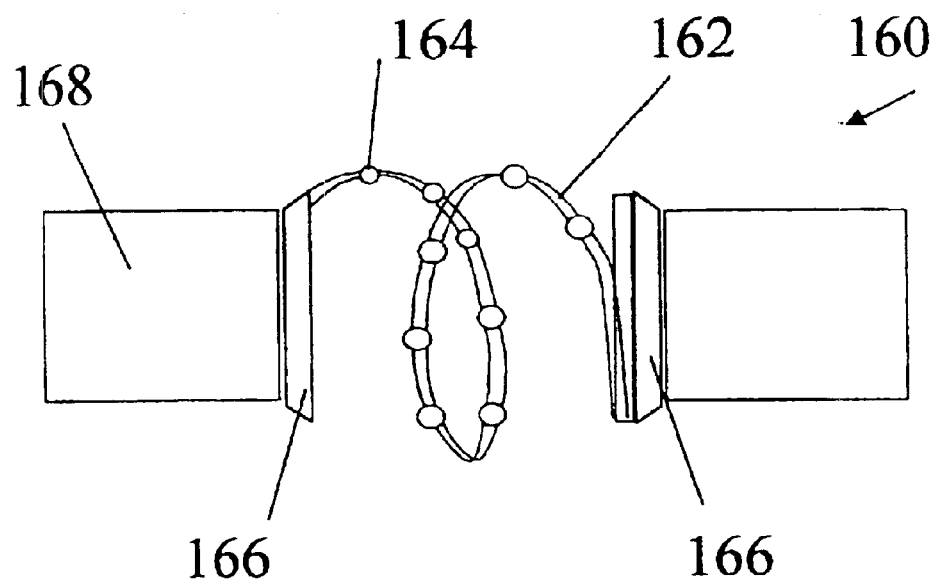
FIG. 14 is a schematic side elevation of a fourth embodiment of the present invention.
Figure 15:
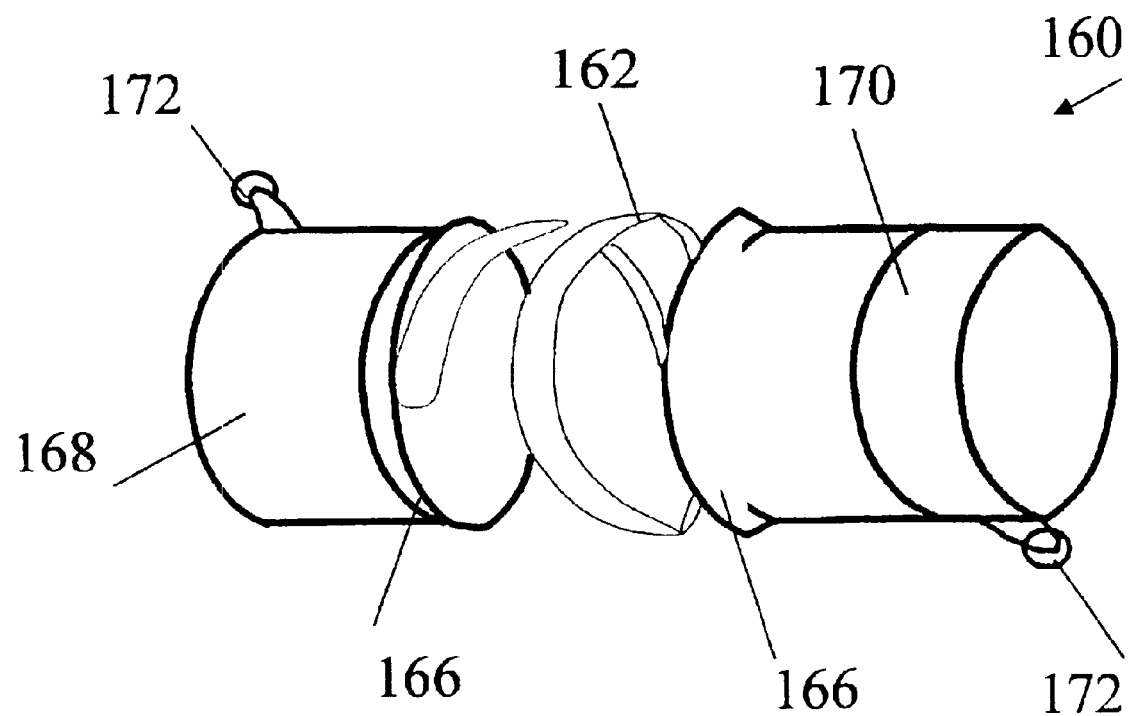
FIG. 15 is an isometric view of the vehicle of the FIG. 14.

Referring to FIGS. 14 and 15, there is shown a further alternative embodiment of a vehicle 160. Vehicle 160 includes a helical drive arm 162 which is provided on its outer surface with wheels 164, the wheels 164 engaging the inner surf ace of a pipeline (not shown). The arm 162 is attached at each end to an annular collar 166 which allow for rotation of the arm 162. The embodiment shown in FIG. 15 has a strip contact on the helix 162 as opposed to wheels 164. The helix can be extended and contracted in pitch by means of a piston (not shown) between the two ends of the device.

A power generator is encased within housing 168 and may comprise any of the power generators described herein. The housing 168 includes a mechanical gearbox or the electro-mechanical power generator as described previously. Spokes (not shown) connect the power generator to the helical arm 162. A second housing 170 provides for fluid flow out of the vehicle 160. A plurality of stabilisers 172 are provided on the outside of housings 168, 170, preferably spaced equi-distantly around the periphery. Stabilisers 172 typically incorporate shock absorption as described before. It should be noted that the mechanical shock absorption described previously is by way of example only, and pneumatic, hydraulic or other types of shock absorption coupling may be used. The stabilisers resist rotation of the housing 168, 170 by contact with the inner surface of the pipe (not shown).

The interior surface of housing 168 may be funnel-shaped to direct fluid flow through the vehicle into the path of the power generator housed therein. The power generator and the housing can incorporate the gearbox or electrical power generator such as a brushless DC motor. A shock absorber can be incorporated if desired.

Referring to FIGS. 21 to 25 there is shown a further alternative embodiment of a vehicle 210. The vehicle 210 comprises a helical drive arm 212 attached at each end to annular collars 216 which allow for axial rotation of the arm 212. The rotation of the arm 212 against the wall of the pipe drives the vehicle 210 in an axial direction along the pipe. This can be against or in the direction of flow in the pipe. The helix can be axially extended and contracted to alter is its pitch by means of a piston (not shown) between the two ends of the device, in order to adjust the speed of the vehicle 210. The simple driven rotation of the helical arm 212 against the pipewall is sufficient to power the translocation of the vehicle 210, but in certain embodiments wheels (not shown) can alternatively or additionally be mounted on the arm 212 (optionally driven by worm gears) in order to drive the rotation.

Two power generators 218, 219 are provided. The first typically powers the axial rotation of the helical arm 212 as described herein after. The second is typically reserved to power a trailer 300 which may comprise cleaning or inspection equipment also described later. The vehicle 210 includes a mechanical gearbox or the electro-mechanical power generator as described for previous embodiments.

Spokes 214 connect the helix arm 212 to the power generator. A plurality of optional stabilisers or spokes 213 are provided on the outside of the vehicle 210. The stabilisers 213 and arms 214 typically incorporate any type of shock absorption as described before. Optionally wheels 211 are provided on the vehicle 210 to contact the inner surface of the pipe (not shown) preferably spaced equi-distantly around the periphery to resist rotation of the housing 240, 241 and a nose cone 215 which directs fluid flow within the pipeline towards the blades of the generator.

Other features of previous embodiments particularly from vehicle 160, may be incorporated into this embodiment.

Figure 26:
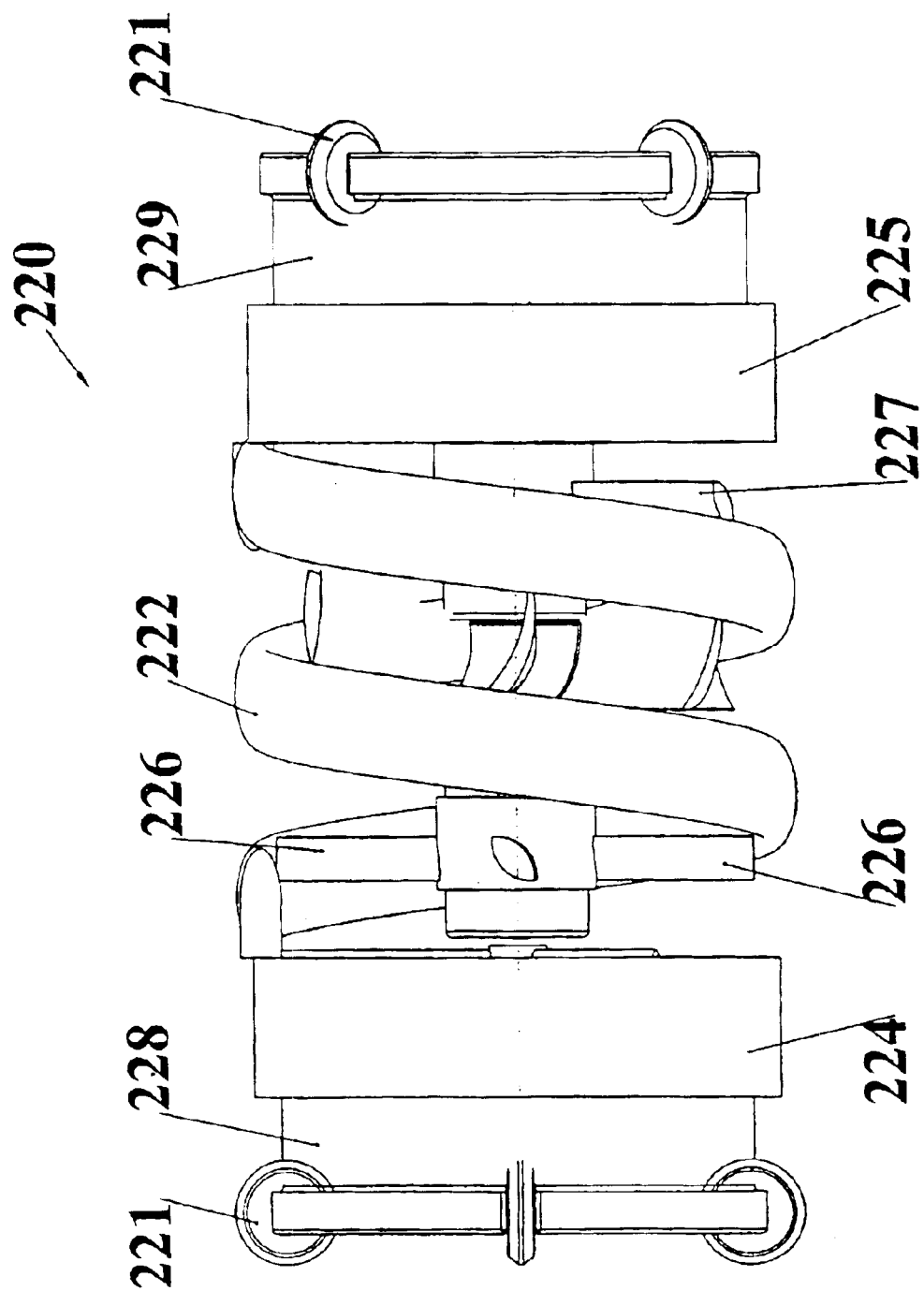
FIG. 26 is a side view of a seventh embodiment of a vehicle.
Figure 27:
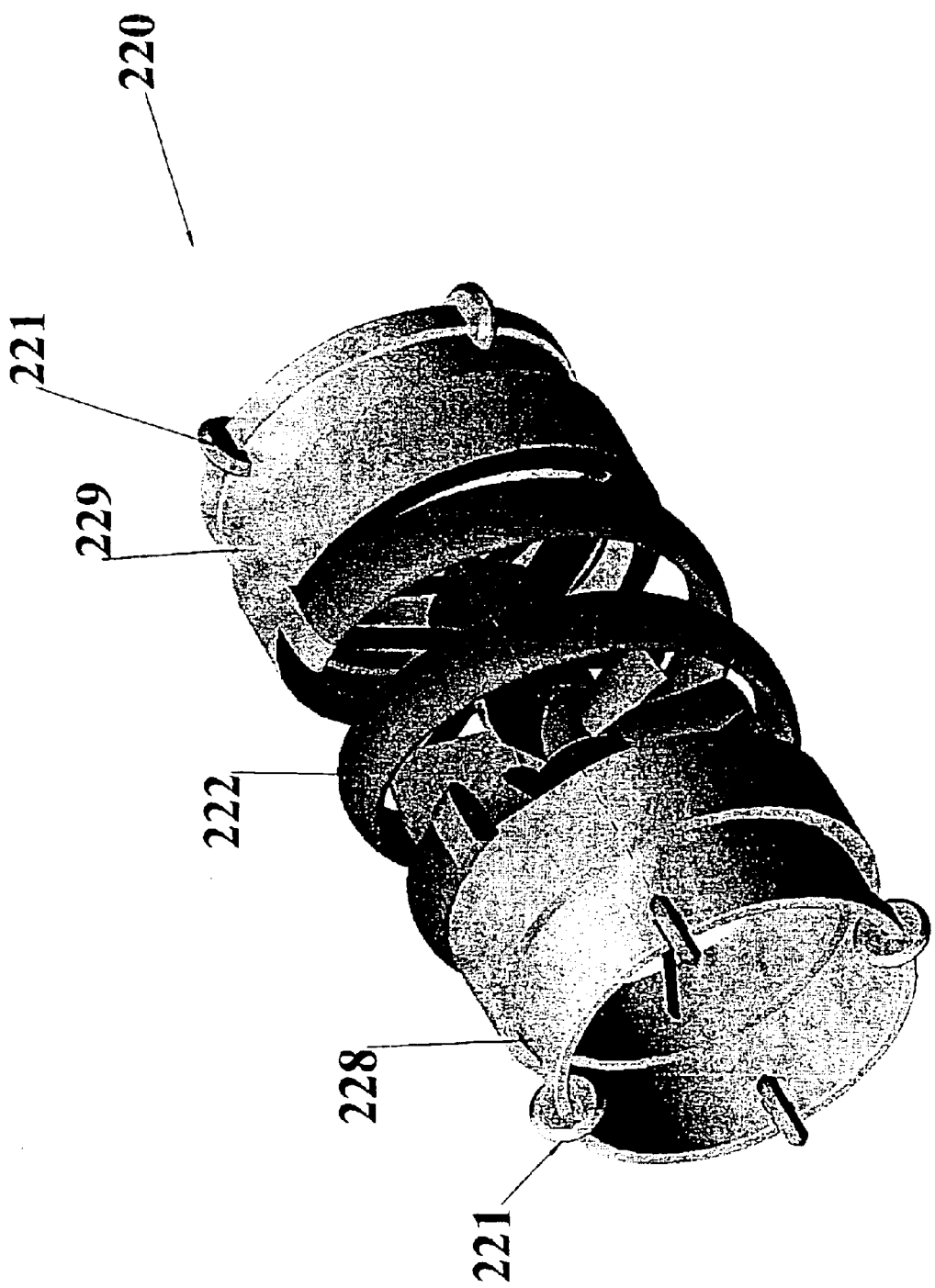
FIG. 27 is perspective view of the vehicle of FIG. 26.
Figure 28:
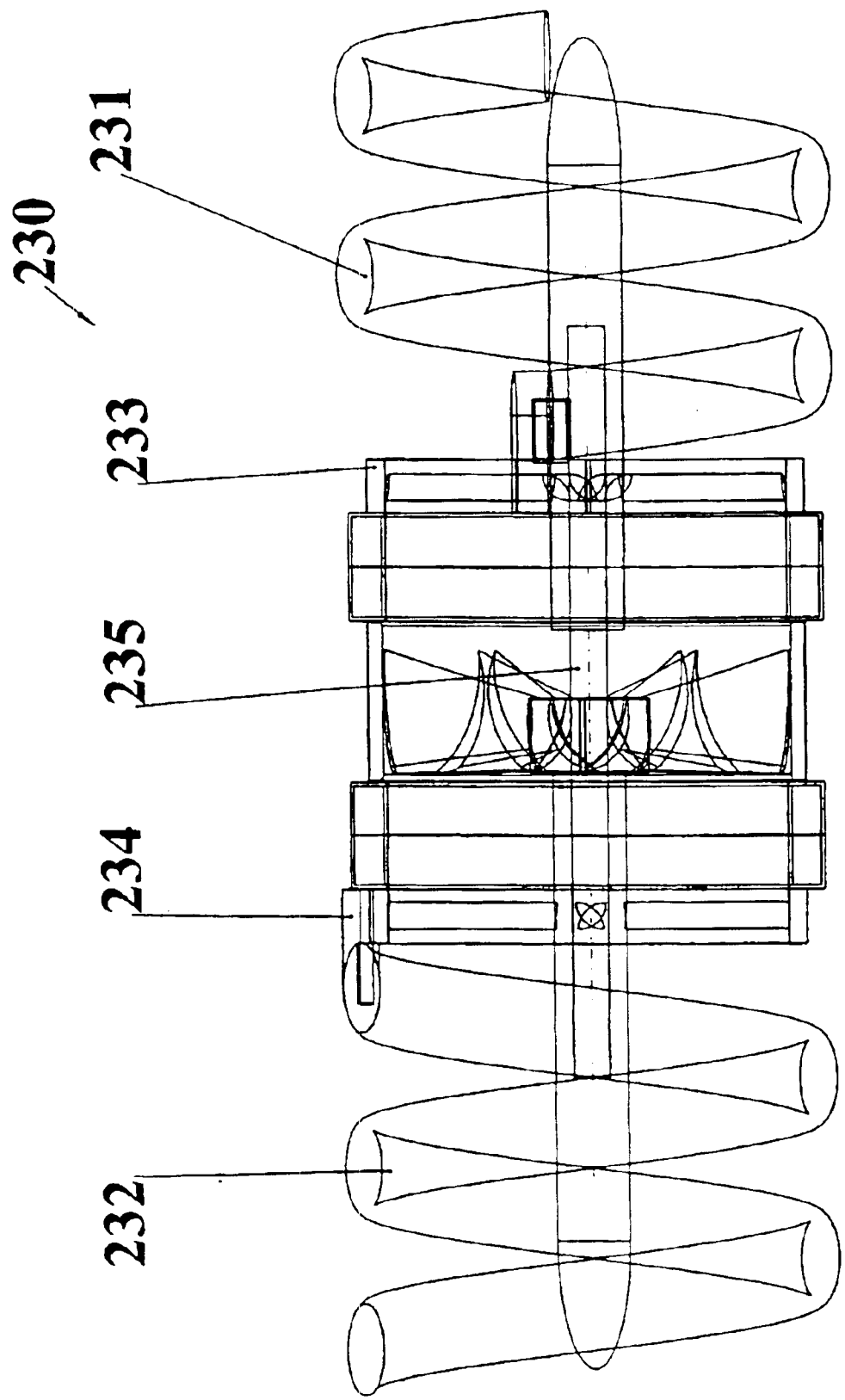
FIG. 28 is a side view of an eighth embodiment of a vehicle.
Figure 29:
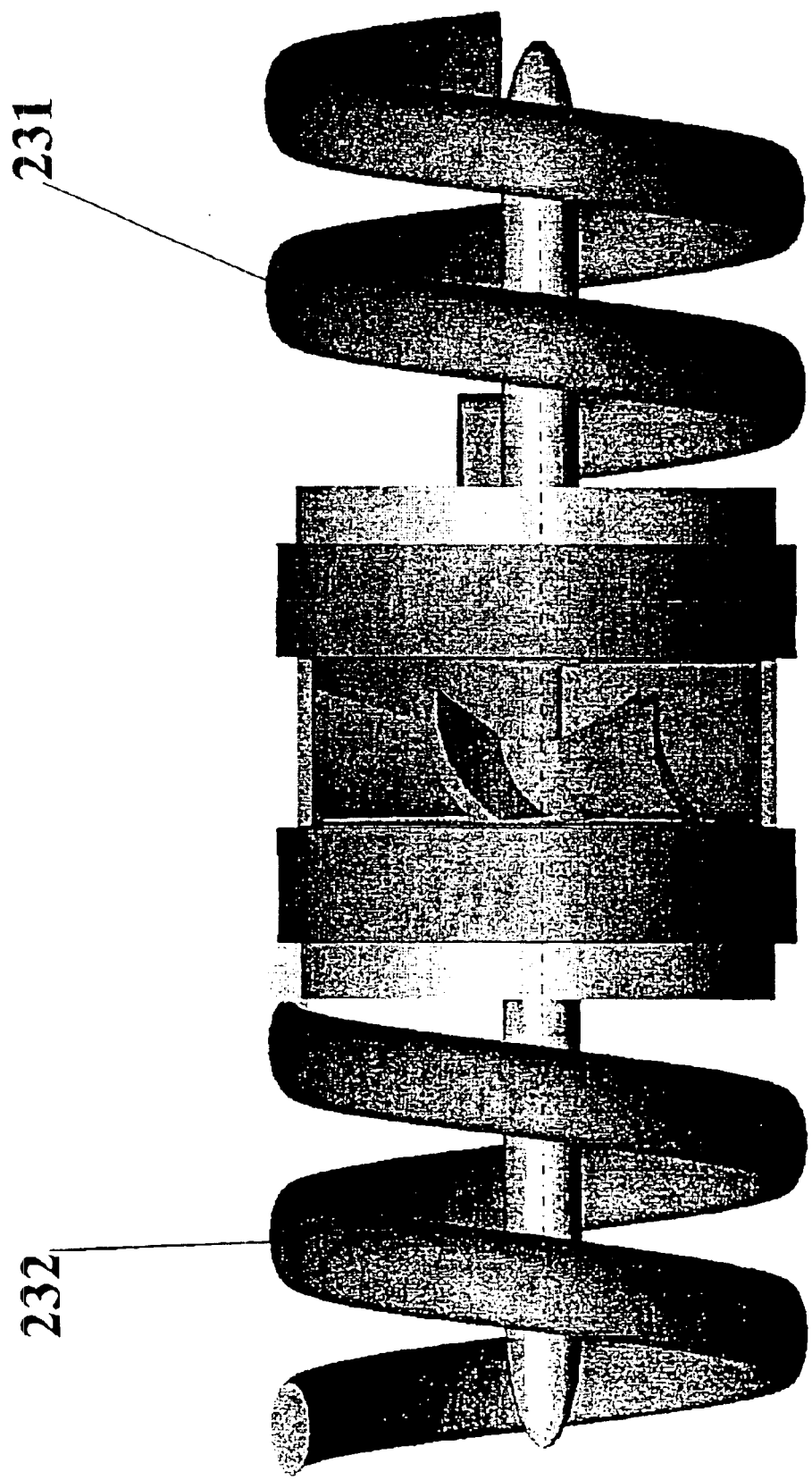
FIG. 29 is a shaded side view of the vehicle of FIG. 28.
Figure 30:
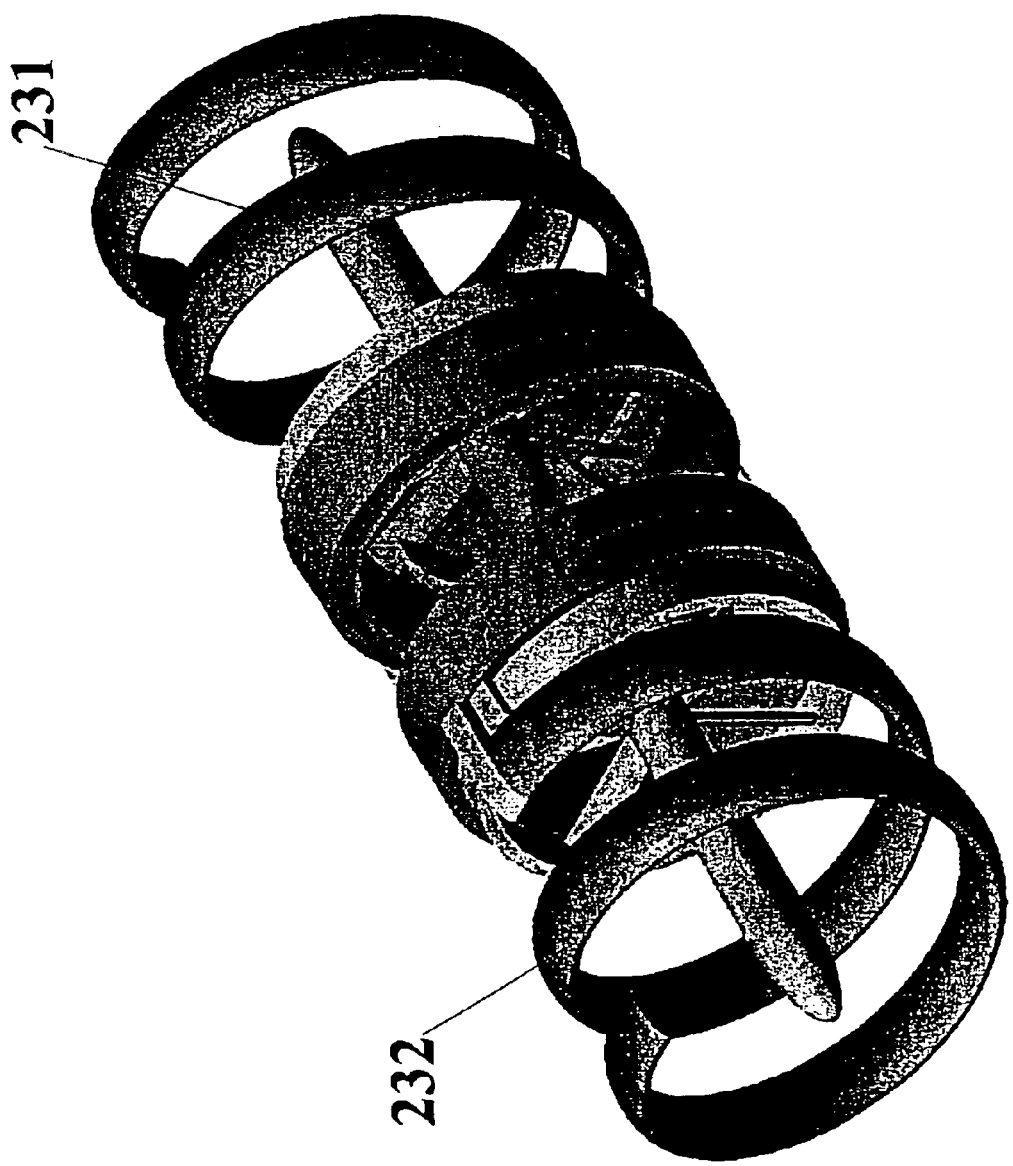
FIG. 30 is a perspective view of the vehicle of FIG. 28.
Figure 31:
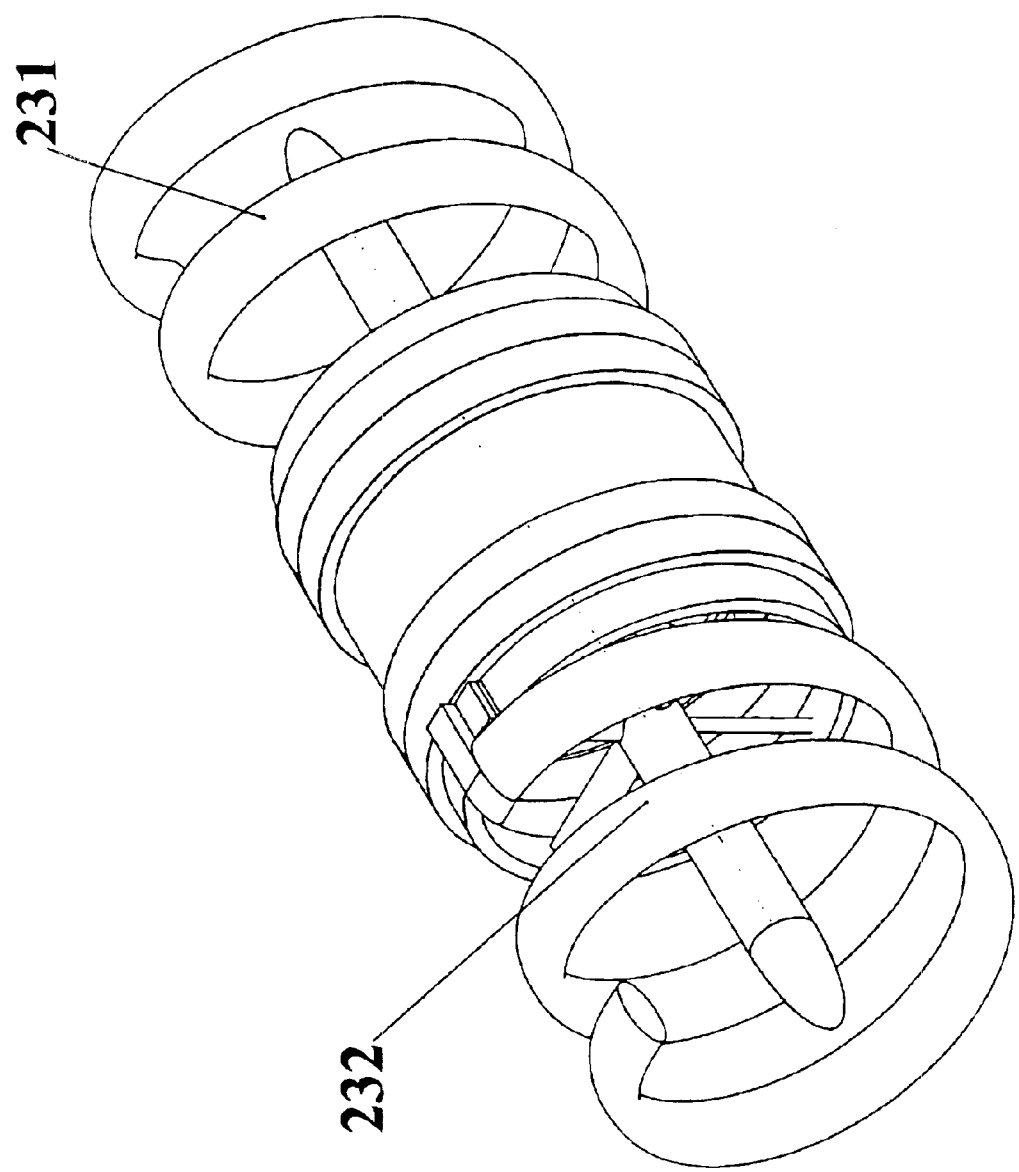
FIG. 31 is a second perspective view of the vehicle of FIG. 28.

Referring now to FIGS. 26 to 27 there is shown a further alternative of a vehicle 220. A helical arm 222 is provided connected to annular rings (not shown) on the housing 224, 225. The power generator is housed within the helical arm 222 and may comprise any of the power generators described herein. The vehicle 220 includes a mechanical gearbox or the electro-mechanical power generator as described previously. Arms 226, 227 extend from the main axle to the helix arm 222 and so link the power generator to the helix 222. Typically a piston (not shown) is provided to extend and contract the two ends of the helical arm 222. Stabilisers 221 resist rotation of the outer bearing housing 228, 229. An advantage of this embodiment is that additional apparatus(not shown) e.g. cleaning or surveying equipment, may be mounted within the housing 228, 229 or provided for in a tractor 300 described herein later, conveniently attached to the vehicle 220.

Figure 32:
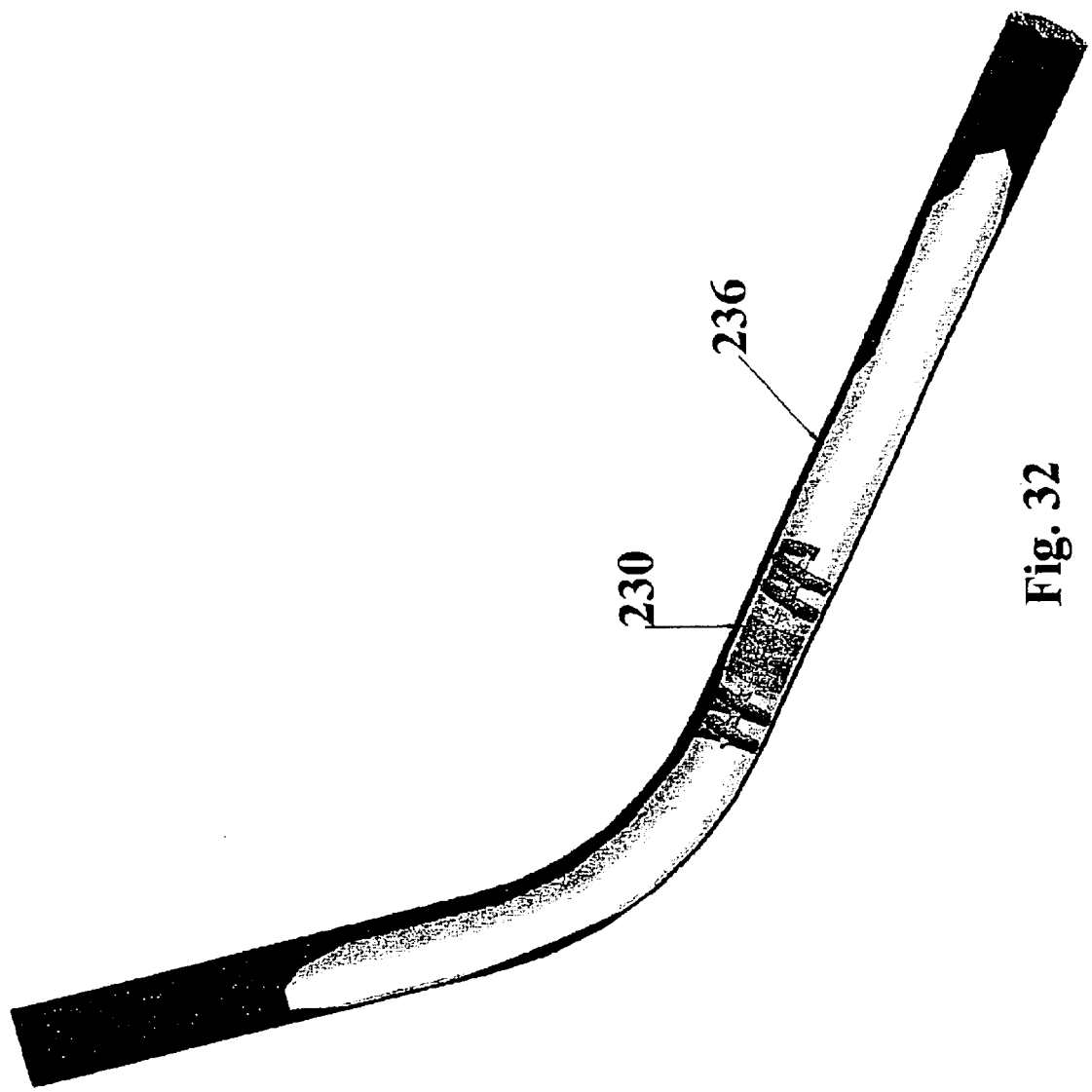
FIG. 32 is a sectional perspective view of the vehicle of FIG. 28 in use.
Figure 33:
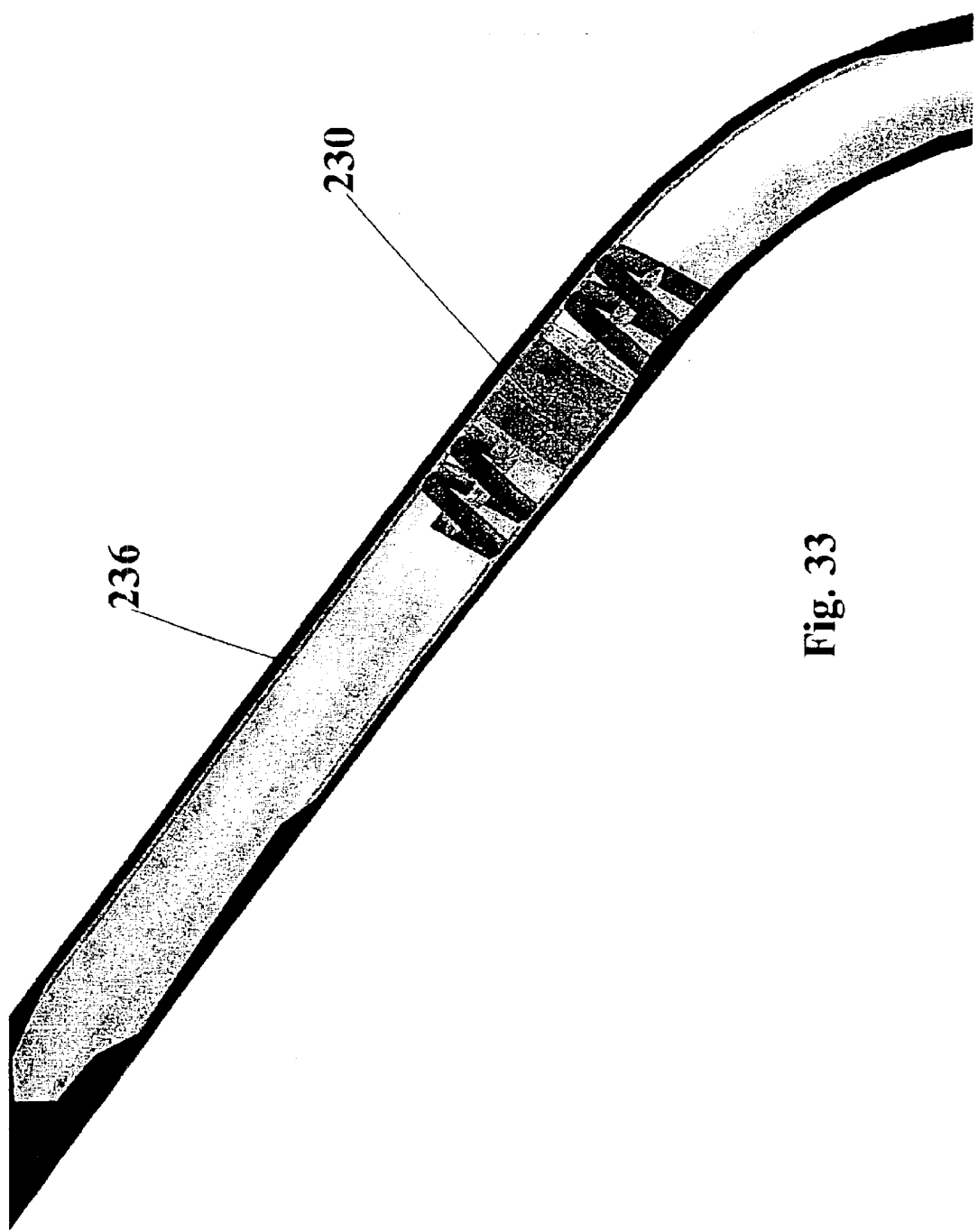
FIG. 33 is a second sectional perspective view of the vehicle of FIG. 28 in use.

Referring now to FIGS. 28 to 31 there is shown a further alternative embodiment of a vehicle 230. The vehicle 230 comprises two helical arms 231, 232 each attached to an annular ring 233, 234 respectively. Spokes (not shown) connect a power generator 235 to the helical arms 231, 232. The annular rings 233, 234 are powered to rotate oppositely with respect to each other by the power generator 235 which may comprise any of the power generators described herein and a mechanical gearbox or the electro-mechanical power generator as described previously. The contra-rotating helical arms 231, 232 provide extra stability to the vehicle. A piston (not shown) may be provided to extend or contract the length of each helical arm 231, 232. Referring to FIGS. 32 to 33 the vehicle 230 is shown in use, moving through a pipe 236.

Figure 17:
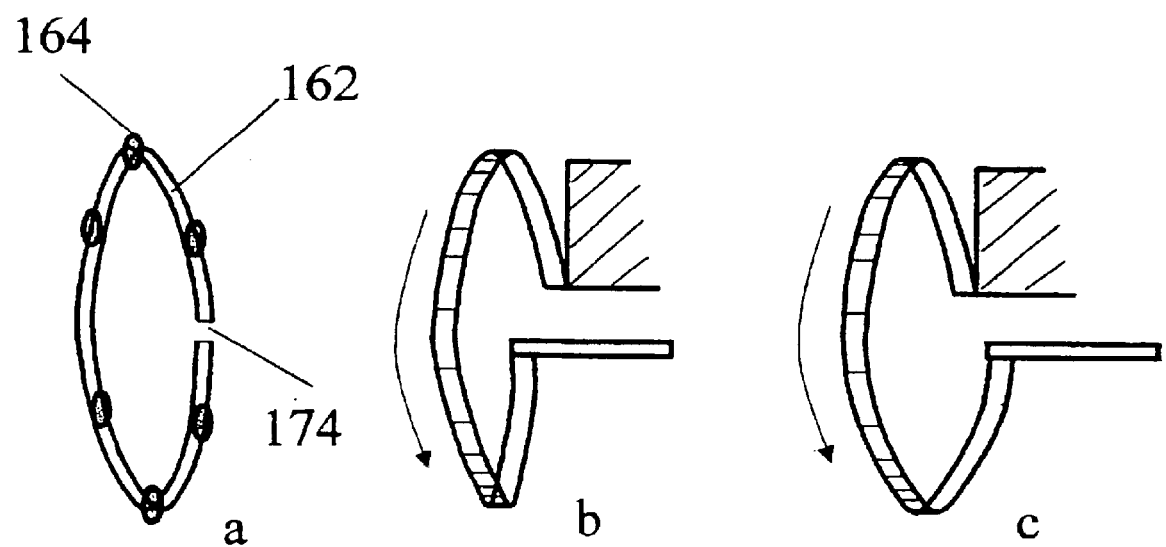
FIGS. 17a to 17c illustrate a helix drive assembly.
Figure 18:
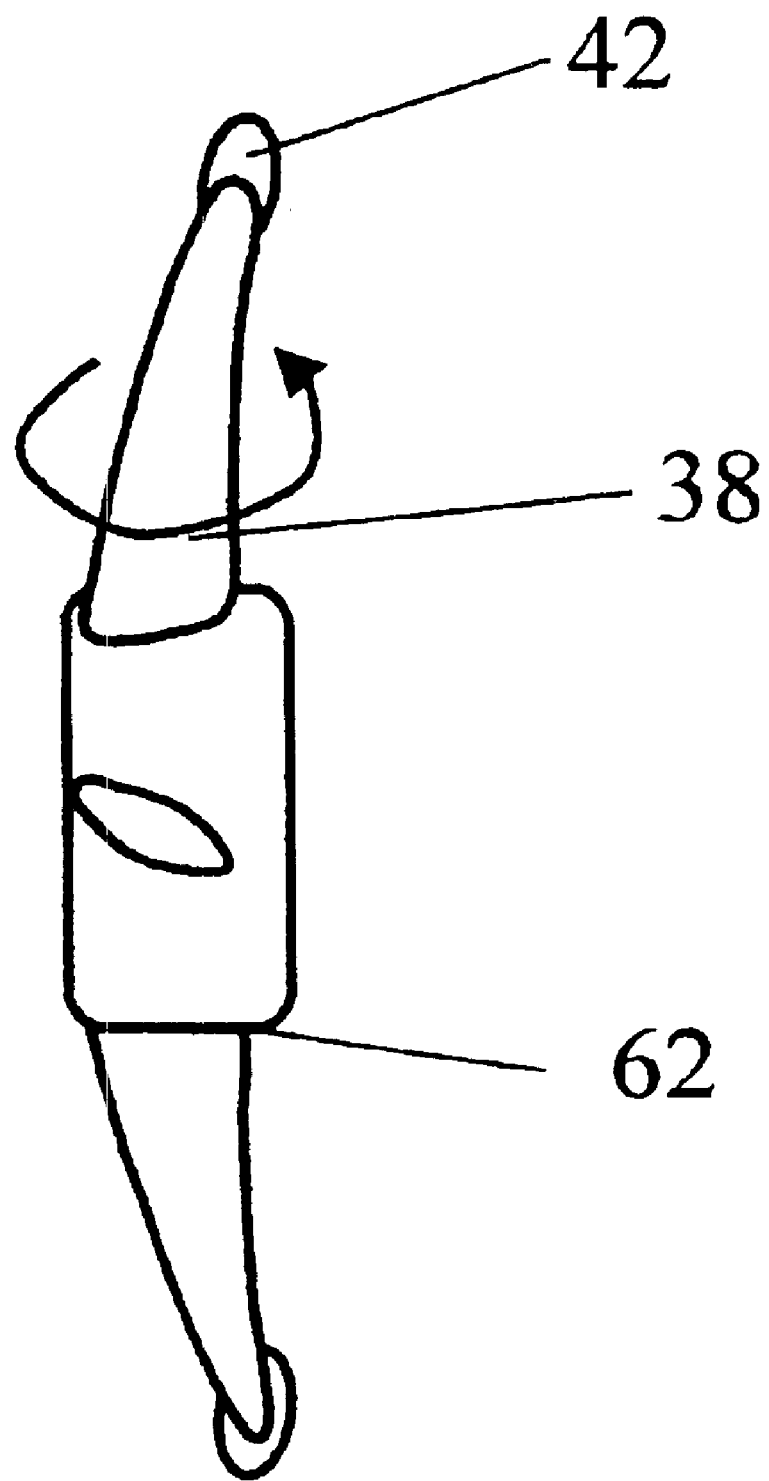
FIG. 18 shows an alternative wheel drive assembly.

Referring now to FIGS. 17a to 17c, the pitch of the helical arm and thus the axial velocity of the vehicles 160 may be controlled. Helical arm 162 typically comprises an annular ring which has a slit 174 therein. As shown in FIG. 17a, if the arm 162 is held in an annular ring, no axial force will be imparted to the vehicle and it will remain idle, although the arm 162 can rotate. However, if one end of the arm 162 is held stationary as shown in FIG. 17b and the other end is displaced towards the left, the arm 162 will adopt a helical configuration and the vehicle will move towards the left. Referring now to FIG. 17c, if the same end of the arm 162 is held stationary and the other end is moved towards the right as shown in FIG. 17c, then the vehicle will move towards the right. It should be noted that it is the direction of initial displacement of the arm 162 which governs the direction of travel of the vehicle, thus making the vehicle bi-directional irrespective of the direction of rotation of the arm 162. In addition, by varying the pitch of the helix to a greater or lesser extent, the velocity of the vehicle in the direction of travel can be increased or decreased accordingly. For example, forcing the arm 162 into a loose helix increases the speed, and conversely forcing the arm 162 into a tighter helix decreases the speed but lowers the gearing of the vehicle so that it can travel more easily against retarding forces. The axial velocity of vehicles 210, 220, 230 may be varied by altering their helical arms 162, 212, 222, 231, 232 in a similar manner. In addition to providing a drive means, the helical arms 162, 212, 222, 231, 232 remove matter from the inside of the pipe through which the vehicle 160, 210, 220, 230 travels.

Moreover, when the vehicle 160, 210, 220, 230 approaches a bend in the pipe through which it is travelling, the helical arm can automatically adapt to the shape of the bend and so reduce stresses applied to the vehicle.

For embodiments comprising a helical arm, the pitch of the helix can be varied by increasing or decreasing the distance between the annular collars, which can be done by means of a hydraulic ram or similar device. This can be triggered remotely or as a result of the on-board controller.

Figure 19A:
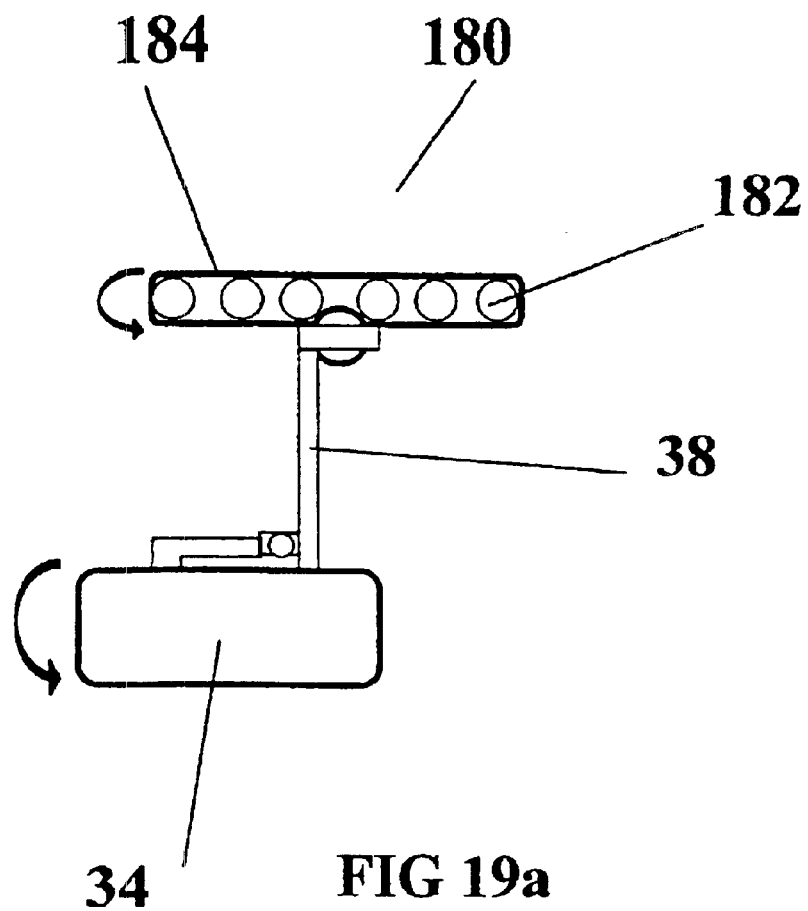
FIG. 19 shows a caterpillar or track drive assembly.
Figure 19B:
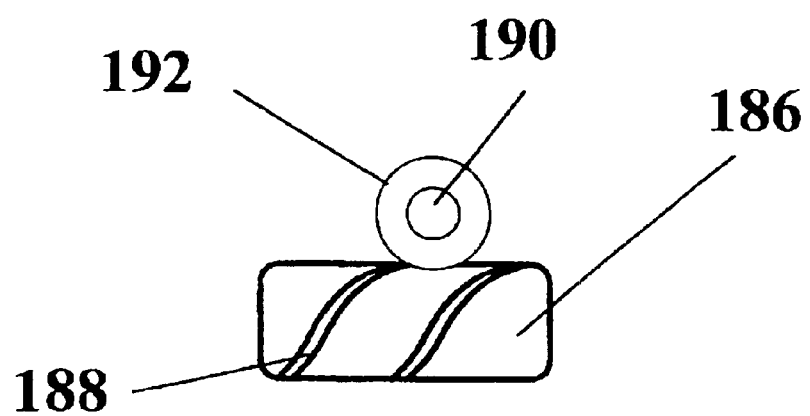

A further alternative drive mechanism for the vehicle is shown in FIG. 19a. An endless track unit 180 is provided on the end of the drive arm 38 to provide the drive force to the vehicle. The endless track unit typically comprises a plurality of wheels 182 upon which an endless driven belt 184 can rotate. A worm gearing, illustrated in FIG. 19b, translates the rotation from the output shaft 34 of the gearbox 30 to a motion that drives the belt 184.

It should be noted that the attitude of the track unit 180 can be adjusted using an adjustment mechanism similar to that for the wheel housing 40 shown in FIGS. 1 to 4. This allows for control of the speed and direction of the vehicle to which the tractor unit 180 is attached as previously described. The worm gearing shown in FIG. 19b includes a shaft 186 which has a spiral protrusion 188 thereon. A second shaft 190 is mounted perpendicular to the first shaft 186, the second shaft 190 being provided with a spiral protrusion 192 similar to protrusion 188 for engagement therewith. Thus, rotation of the first shaft 186 causes inter-engagement of the protrusions 188, 192 which then rotates shaft 190.

Figure 20:
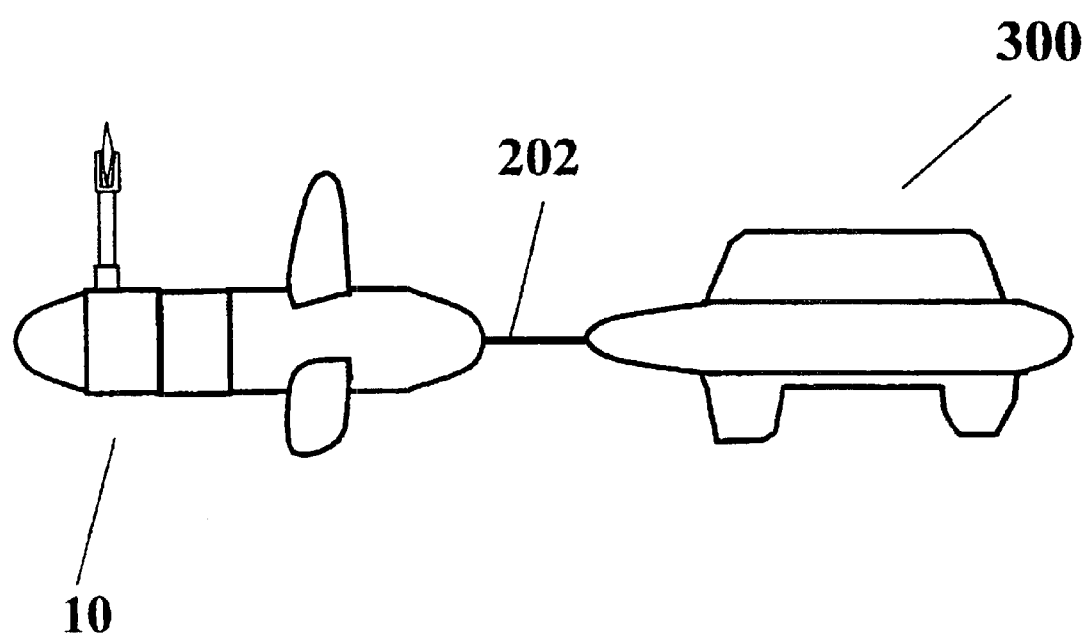
FIG. 20 shows a trailer attached to a vehicle.
Figure 21:
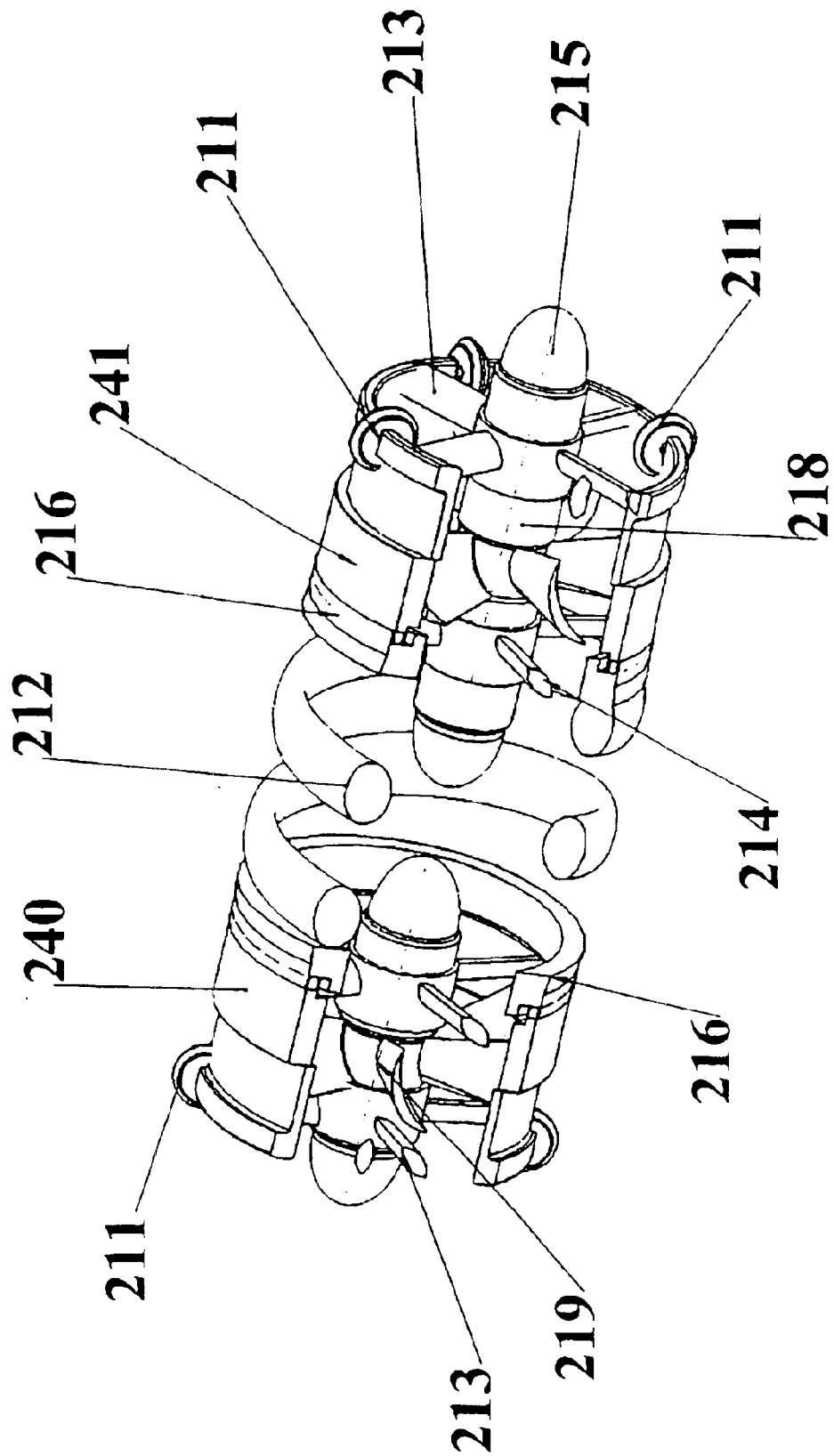
FIG. 21 is a sectional perspective view of a sixth embodiment of a vehicle.
Figure 22:
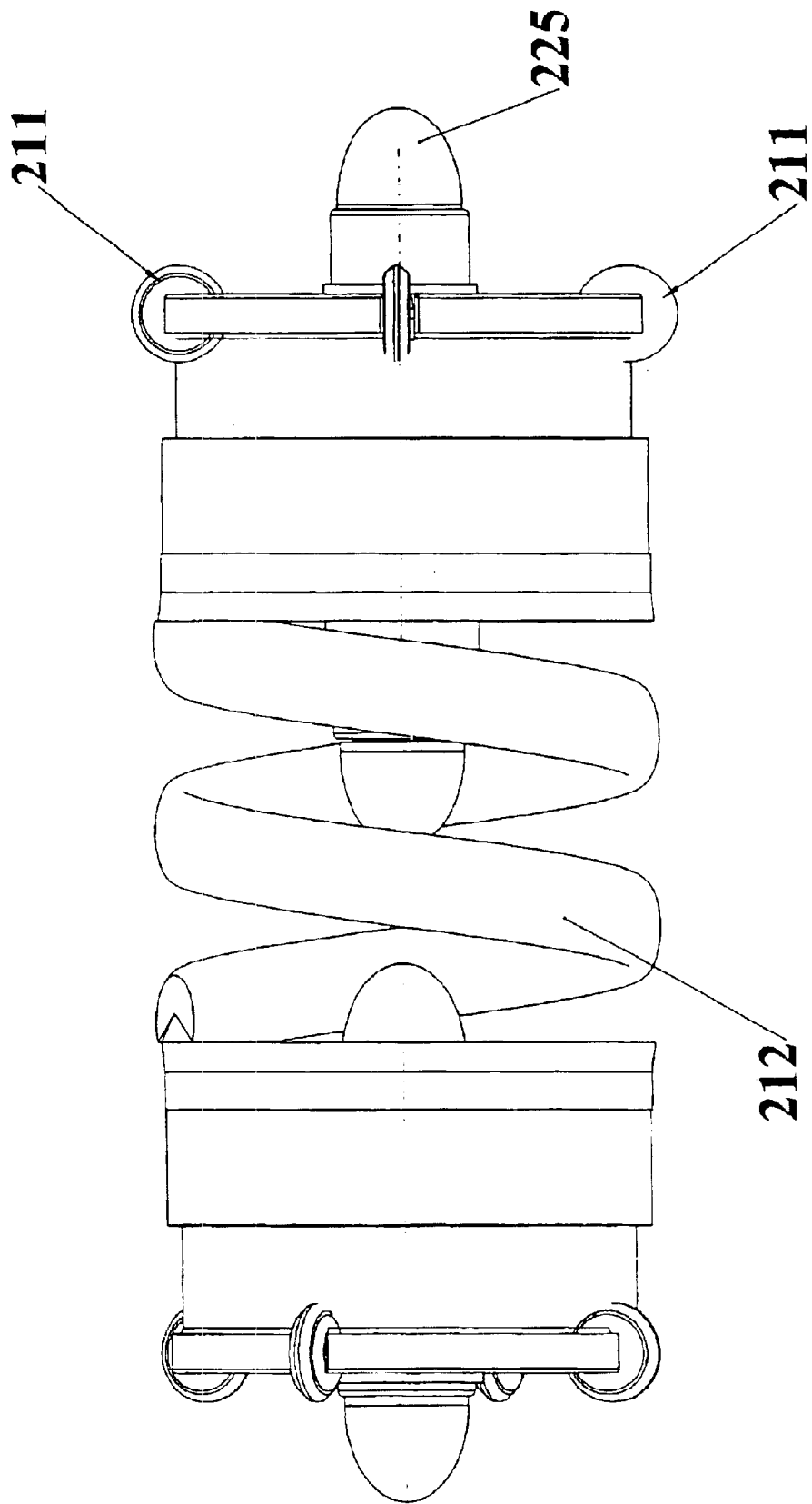
FIG. 22 is a side view of the vehicle of FIG. 21, showing a line drawing of the vehicle.
Figure 23:
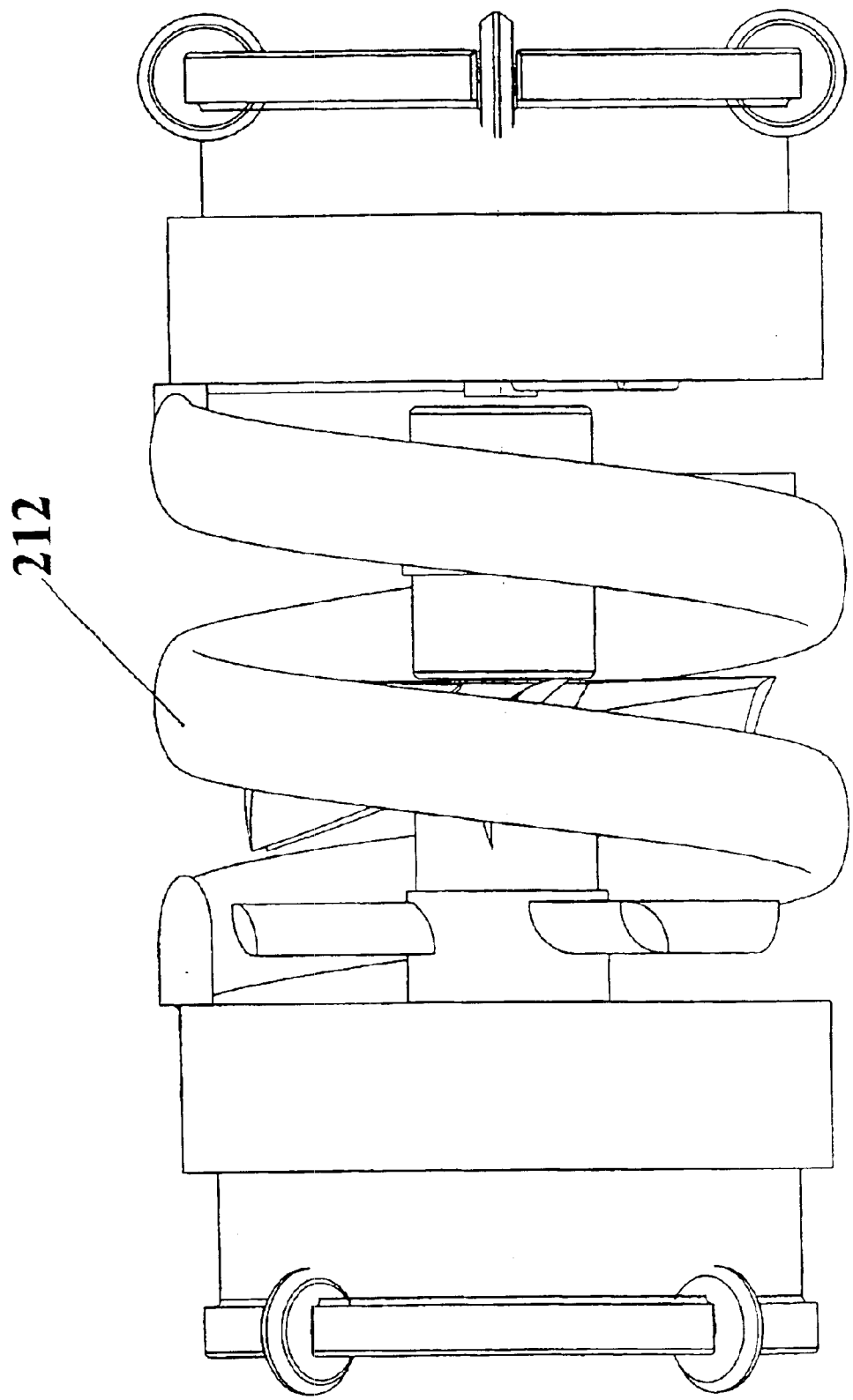
FIG. 23 is a side view of the vehicle of FIG. 21, showing an exterior view of the vehicle.
Figure 24:
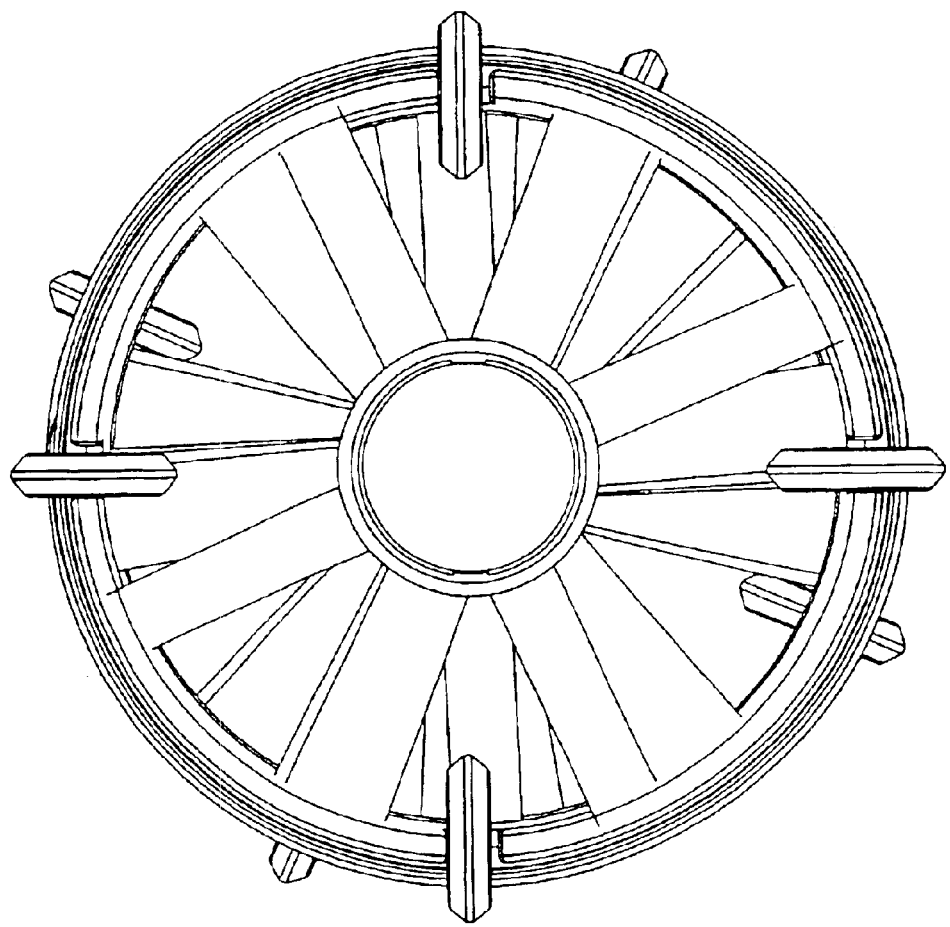
FIG. 24 is end view of the vehicle of FIG. 21.
Figure 25:
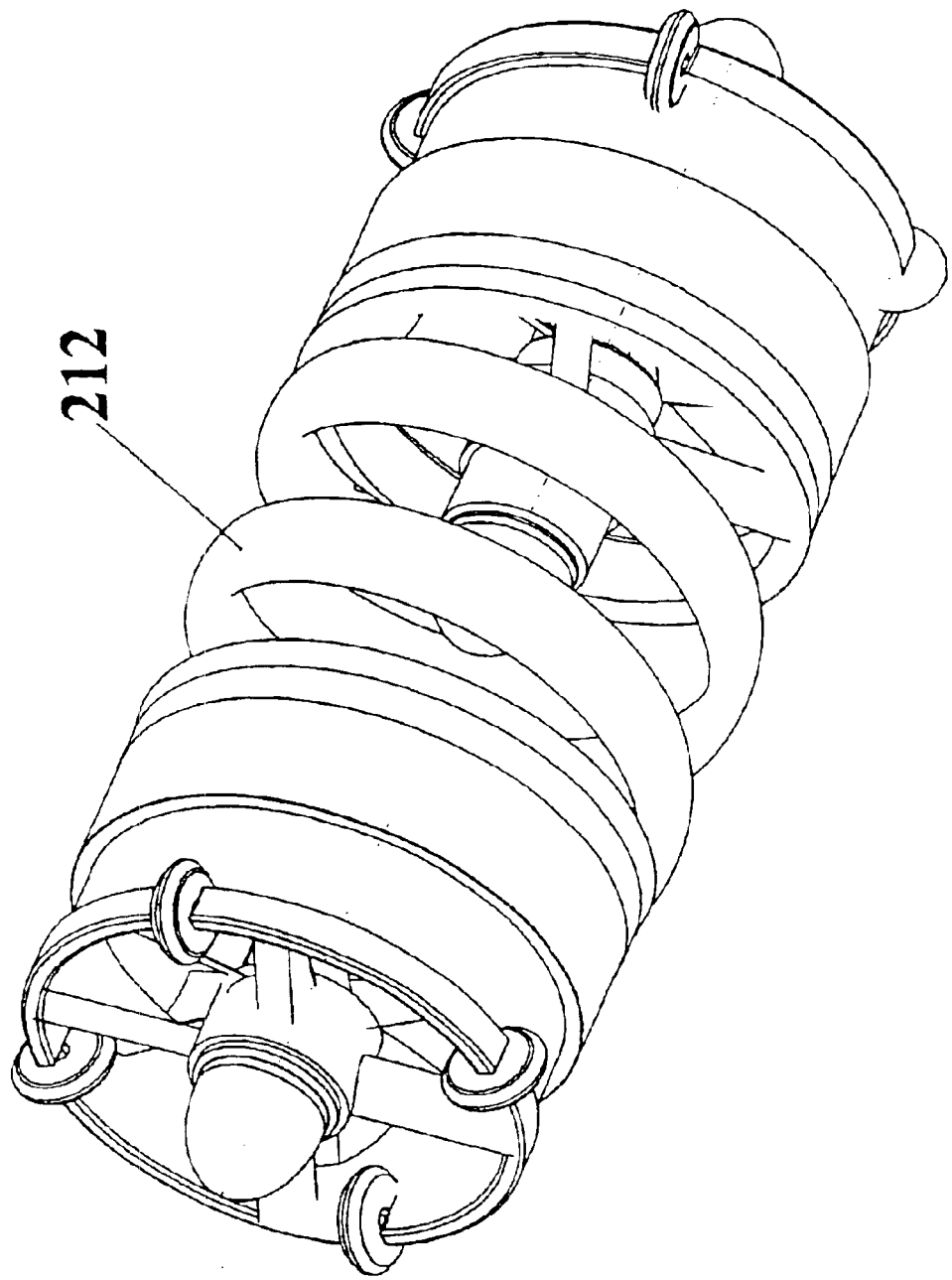
FIG. 25 is a perspective view of the vehicle of FIG. 21.

Referring now to FIG. 20, there is shown a vehicle which may comprise any of the vehicles 10, 130, 140, 160, 200, 210, 220, 230 which has a trailer 300 attached thereto. The trailer 300 is attached to the tractor unit 10 using a coupling 202, the coupling 202 preferably including electrical connectors for transferring the electrical power generated by the vehicle 10 to the trailer 300. It should be noted that the trailer 300 can be attached to the tractor 10 so that the trailer is either pushed or pulled along. The trailer 300 typically includes pipeline logging, inspection and/or cleaning equipment. The coupling 202 is preferably articulated so that the tractor 10 and trailer 200 can negotiate any bends in the pipeline. The tractor 10 can be used to pull or push any kind of downhole equipment which may be required such as pipeline intervention, cleaning or inspection equipment, as will be appreciated by those skilled in the art. It should also be noted that the pipeline intervention, cleaning or inspection equipment can be attached to the vehicle, thus negating having to use a trailer 300.

The cleaning equipment is typically used to clean the interior of the pipeline. This increases the efficiency of fluid transport through the pipeline.

Surveying and inspection equipment can be used to assess the integrity and serviceability of the pipeline.

The vehicles 10, 130, 140, 160, 200, 210, 220, 230 may be used in any application which requires cleaning, inspection or other work performed within a pipe, some (not exclusive) examples are within the water, gas, nuclear or oil industries. The vehicle is capable of travelling in pipes used to transport liquid, gas or a mixture thereof.

The vehicle may be launched into production tubing from a platform or a remote wellhead or well cluster while production is in progress. Thus, inspection and/or cleaning can be achieved without affecting the production of hydrocarbons.

The vehicle may carry an odometer which can trigger the release of a fail-safe mechanism so that the vehicle may be retrieved after a certain distance. The fail-safe mechanism may also be triggered externally by a signal transmitted though the pipe wall or a probe therein.

The vehicle may be left idling within a pipeline until an external signal triggers the vehicle to move in a given direction at a given velocity to inspect or clean the pipeline or the like. As the direction and speed of the vehicle is controllable, the vehicle can be used to do an initial high speed scan of the entire pipeline, noting areas which require further and more detailed inspection or cleaning. The vehicle can then be directed back to these areas by reversing its direction and then the velocity of the vehicle can be reduced to give a more thorough inspection.

The vehicle is advantageously provided with an electronic control module, which may comprise an on-board computer for example, to control the speed and direction of the vehicle. In addition, the control module can provide other functions such as the telemetry system and/or control and operation of the cleaning, inspection or intervention equipment attached thereto.

Any of the vehicles described herein may be provided with a fail-safe mechanism to ensure that the vehicle can be retrieved in the event of a failure. The fail-safe mechanism may be, for example, a parachute or drogue which is deployed from the rear of the vehicle. The parachute/drogue will open once deployed and will catch the flow of fluid within the pipeline, thus carrying the vehicle with the flow of fluid to any point within the pipeline where it can be retrieved. A line may optionally be attached to the vehicle so it may be towed in the event of a failure.

The vehicle can also carry a telemetry system wherein the instrumentation or other equipment carried thereon can communicate with a receiver located either at the surface or on an ROV which is moving alongside the vehicle, but perhaps outwith the pipeline. The telemetry system can communicate using any conventional means such as the pipeline, ultrasonic sound or otherwise.

In certain embodiments the drive wheels/arms can be set at an angle for a particular velocity that can be adjusted by the control module. In the case of electrical drive means, the angle and speed of rotation may change in order to adjust the vehicle's axial velocity through the pipe. In the case of mechanical couplings, the velocity may be varied according to the angle of contact between the wheel/arm and the pipe wall, or by changing the gearbox ratios. The gearbox can be adapted to reduce rpm and increase torque.

Modifications and improvements may be used to the foregoing without departing from the scope of the present invention. Air or hydraulic rams may be provided on the vehicle and an articulated joint made so that the vehicle can negotiate bends within the pipeline.

One advantage that arises from the helical form of drive arm is that a vehicle with such an arm can be moved from narrow diameter pipes to large diameter pipes and the helix can radially expand to a large extent to force the arm against the wall of the pipe in each case.

What is claimed is:

1. A vehicle for a pipe, having a power generator driven by fluid flowing past the generator, at least one drive means adapted to propel the vehicle axially along the pipe, and a power transmission mechanism connecting the power generator to the drive means, wherein the power from the generator is transmitted from the generator via the transmission mechanism to the drive means to power the drive means and to propel the vehicle axially along the pipe, and wherein the drive means includes at least one drive head rotatable relative to the vehicle around the axis of the vehicle and biased radially outward from the vehicle against the inside surface of the pipe, and wherein the attitude of the drive head with respect to the axis of the pipe can be set at a selected value between 0° and 90°, whereby rotation of the drive means around the axis of the vehicle drives the head in a helical path on the inner surface of the pipe, thereby propelling the vehicle axially along the pipe.

2. A vehicle as claimed in claim 1, wherein the drive means can be adapted to follow a helical path along the pipe.

3. A vehicle as claimed in claim 1, wherein the generator comprises at least one turbine.

4. A vehicle as claimed in claim 3, wherein the generator comprises at least one annular ring turbine having vanes extending inwardly from an outer annular ring.

5. A vehicle as claimed claim 3, wherein the attitude of the turbine vanes can be adjusted.

6. A vehicle as claimed in claim 3, having a first turbine, a second turbine, and ancillary equipment, wherein the first turbine powers the drive means and the second turbine powers the ancillary equipment.

7. A vehicle as claimed in claim 3, wherein the drive means comprises wheels disposed against the inner surface of the pipe and coupled to the turbine vane via a gearbox and shaft so that rotation of the turbine shaft drives the drive wheels along the inside surface of the pipe.

8. A vehicle as claimed in claim 1, wherein the generator comprises first and second turbines.

9. A vehicle as claimed in claim 8, wherein the turbines are arranged to rotate in opposite directions.

10. A vehicle as claimed in claim 1, wherein the power from the generator is coupled to a motor selected from the group consisting of electrical, hydraulic, pneumatic, and hydrodynamic motors.

11. A vehicle as claimed in claim 1, having a power storage means on the vehicle, wherein the power generator is adapted to charge the power storage means on the vehicle.

12. A vehicle as claimed in claim 1, wherein the drive means is adapted to grip or cut into the inner surface of the pipe.

13. A vehicle as claimed in claim 1, having means for dislodging debris from the pipe wall.

14. A vehicle as claimed in claim 1, wherein the drive means comprises one or more wheels disposed in a row on one or more drive heads carried on one or more arms on the vehicle.

15. A vehicle as claimed in claim 1, having a controller to regulate the speed and direction of the vehicle through the pipe.

16. A vehicle as claimed in claim 1, having at least one stabiliser means to maintain the attitude of the body of the vehicle relative to the pipe.

17. A vehicle as claimed in claim 1, wherein the drive means comprise first and second drive arms adapted to rotate in opposite directions.

18. A vehicle as claimed in claim 1, wherein the drive means is adapted to engage the inner wall of the pipe in a wide variety of pipe diameters.

19. A vehicle as claimed in claim 1, wherein the drive means comprises a helical arm.

20. A vehicle as claimed in claim 19, wherein the pitch of the helical arm is variable.

21. A vehicle as claimed in claim 19, wherein the helical arm can be compressed or expanded radially to accommodate different diameters of pipe.

22. A vehicle as claimed in claim 1, having an articulated joint.

23. A vehicle as claimed in claim 1, wherein the attitude of the drive head with respect to the axis of the pipe can be varied while the vehicle is in motion.

24. A method of propelling the vehicle of claim 1, through a pipe, the method comprising the steps of passing fluid past the vehicle to drive the generator, transmitting power from the generator via the transmission mechanism to rotate the drive head around the axis of the vehicle, and setting the attitude of the drive head with respect to the axis of the vehicle at a selected value between 0° and 90°, whereby rotation of the drive means drives the drive head in a helical path on the inner surface of the pipe, thereby propelling the vehicle axially along the pipe.

25. A vehicle for a pipe, having a power generator driven by fluid flowing past the generator, at least one drive means comprising a helical arm rotatable around the axis of the vehicle and biased radially outward from the axis of the vehicle, and adapted to propel the vehicle axially along the pipe, and a power transmission mechanism connecting the power generator to the drive means, wherein the power from the generator is transmitted from the generator via the transmission mechanism to the drive means to rotate the drive means around the axis of the vehicle, whereby rotation of the drive means around the axis of the vehicle drives the arm in a helical path along the inner surface of the pipe, thereby propelling the vehicle axially along the pipe.

* * * * *